US005704045A

United States Patent [19]
King et al.

[11] Patent Number: 5,704,045
[45] Date of Patent: Dec. 30, 1997

[54] SYSTEM AND METHOD OF RISK TRANSFER AND RISK DIVERSIFICATION INCLUDING MEANS TO ASSURE WITH ASSURANCE OF TIMELY PAYMENT AND SEGREGATION OF THE INTERESTS OF CAPITAL

[76] Inventors: Douglas L. King, 6604 Covehollow Rd., Oklahoma City, Okla. 73123; Alasdair G. Barclay, The Boathouse, 6 Shaw Wood Rd., Pembroke, Bermuda, HM01; Rockie C. Wellman, 727 Cedardale, Oklahoma City, Okla. 73127

[21] Appl. No.: 370,060

[22] Filed: Jan. 9, 1995

[51] Int. Cl.$^6$ .................................................. G06F 17/00
[52] U.S. Cl. ........................................... 395/235; 395/238
[58] Field of Search ....................... 364/400, 401, 364/402, 408; 340/825.26, 825.07; 395/201, 235, 236, 237, 238, 239, 240, 242, 243, 244

[56] References Cited

U.S. PATENT DOCUMENTS

| | | |
|---|---|---|
| 3,634,669 | 1/1972 | Soumas et al. . |
| 4,232,367 | 11/1980 | Youden et al. . |
| 4,633,397 | 12/1986 | Macco . |
| 4,642,767 | 2/1987 | Lerner . |
| 4,648,038 | 3/1987 | Roberts et al. . |
| 4,706,539 | 11/1987 | Bagheri . |
| 4,742,457 | 5/1988 | Leon et al. . |
| 4,752,877 | 6/1988 | Roberts et al. . |
| 4,766,539 | 8/1988 | Fox . |
| 4,839,804 | 6/1989 | Roberts et al. . |
| 4,876,648 | 10/1989 | Lloyd . |
| 4,989,141 | 1/1991 | Lyons et al. . |
| 5,025,138 | 6/1991 | Cuervo . |
| 5,083,270 | 1/1992 | Gross et al. . |
| 5,101,353 | 3/1992 | Lupien et al. . |
| 5,136,501 | 8/1992 | Silverman et al. . |
| 5,136,502 | 8/1992 | Van Remortel et al. . |
| 5,148,365 | 9/1992 | Dembo . |
| 5,193,056 | 3/1993 | Boes . |
| 5,201,398 | 4/1993 | Clugston . |
| 5,202,827 | 4/1993 | Sober ................................ 364/408 |
| 5,206,803 | 4/1993 | Vitagliano et al. . |
| 5,210,687 | 5/1993 | Wolfberg et al. . |
| 5,237,500 | 8/1993 | Perg et al. . |
| 5,262,942 | 11/1993 | Earle ................................ 364/408 |
| 5,291,398 | 3/1994 | Hagan . |
| 5,297,031 | 3/1994 | Gutterman et al. .............. 364/408 |
| 5,375,055 | 12/1994 | Tosher et al. ..................... 364/408 |
| 5,384,260 | 1/1995 | Osborne et al. . |

*Primary Examiner*—James P. Trammell
*Attorney, Agent, or Firm*—William Squire

[57] ABSTRACT

A system and method of accepting risk through contractual obligations transfers a portion of the risk to investors and includes means for absolute assurance of timely payment to contract holders, and segregation, of the interests of particular investors to specifically identified risks in a risk to capital matching system. The system creates separate ledgers and segregated reserves to tailor particular products for specific needs including transferring difficult to place risks. The system creates agreements which promise payments, based on loss from risks including investment risks. Data processing provides legally segregated relationship management links, supervising and balancing the interests of professionals in a risk transfer and diversification system.

74 Claims, 6 Drawing Sheets

SYSTEM AND METHOD OF RISK TRANSFER AND RISK DIVERSIFICATION INCLUDING MEANS TO ASSURE WITH ASSURANCE OF TIMELY PAYMENT AND SEGREGATION OF THE INTERESTS OF CAPITAL

TECHNICAL FIELD

This invention relates to financial management systems and, more specifically, to data processing methodology for effecting an improved capital and security structure in an insurance or other financial enterprise.

A portion of the disclosure of this patent document contains material which is subject to copyright protection. The owner has no objection to the facsimile reproduction by anyone of the patent disclosure, as it appears in the Patent and Trademark Office patent files or records, but otherwise reserves all copyright rights whatsoever.

DESCRIPTION OF THE PRIOR ART

A number of financial management systems have been proposed in the past. Exemplary systems include U.S. Pat. Nos. 4,232,367, 4,633,397, 4,742,457, 4,752,877, 4,766,539, 4,839,804, 4,876,648, 5,083,270, 5,101,353, 5,136,501 and 5,206,803. However, such prior systems address substantially different problems and accordingly, are significantly different from the risk transfer and risk diversification system of the present invention.

Effective management of risk, which can manifest itself in a variety of forms, is a significant concern of modern business. There are broadly three risk management techniques: reduction, retention, and transfer. Over the past four centuries, several methods have developed to transfer risks which are common to many people. These include banks, insurers, equities and commodities exchanges, the bond and swap markets, and mutual funds, each of which developed from a recognition that numerous parties with similar risk exposures needed effective methods of transfer and a means of determining the value of risk transfer at any given time.

These structures operate on the basis of transferring risk to an entity which utilizes one of two primary forms of capital structure: a capital leveraging system (banks and insurance companies) or a capital matching system (the exchanges and markets).

Under the capital leveraging system, an insurer may accept any type or amount of risk, subject to internal underwriting guidelines and regulatory restrictions. This format provides a significant degree of flexibility in the pricing, terms, and limits of risks accepted. These insurers operate on the premise that premiums cover claims. Their capital is available to pay claims if losses exceed premiums and investment income. The aggregate of policy liabilities though, is generally much larger than their combined premium and capital. So, like a bank which couldn't pay if all depositors asked for their money, insurance companies are not generally designed to pay if all policies claimed their limits.

Leveraging capital, i.e., a small amount of capital compared to the risk exposures assumed, translates a small underwriting profit on premium into a substantial return on capital. Conversely, a relatively small loss over premium results in a significant loss to capital. This system does not absolutely assure an insurer's ability to pay in that an insurer's policy limits are generally much larger than its assets. Hence an insurer must only accept risks common to many people, limiting its exposure to each single risk to a small percentage of its capital, and relying on geographic and risk type diversification, as well as reinsurance, to protect its shareholder's capital. This works well when losses are predictable. It's when insurers accept unique or difficult-to-place risks that premium as well as capital may not be sufficient to cover claims. Even, Lloyd's of London (which operates in a manner similar to a collection of small insurance companies with the exception that should losses exceed available funds, its underwriting members, similar to shareholders, can be forced, in theory, to pay up to the limit of their assets) has experienced such difficulties.

Under the prior art, insurance policies have provided security to insureds based on and no greater than the general claims paying ability rating (the ability to pay claims) of an insurer to perform its obligations. Although reinsurance has sometimes been available, reinsurance policies likewise protect the insurer only to the extent of the reinsurance company's capacity to pay loss claims as they accrue.

In contrast, a capital matching system such as an exchange, accepts risk by matching buyers and sellers, i.e., parties transfer risk to those accepting it, in effect matching risk to capital. Under this system parties transfer or accept risks which are easily quantified in comparatively small units, such as through futures and options contracts. It limits the types and conditions under which parties may transfer to specifically defined contractual units, priced by the marketplace, being a price agreed between those parties wishing to transfer risk and those willing to accept it.

These narrowly defined contracts offer little flexibility in the risk being accepted. Although each investor can select the type and amount of risk accepted, parties transferring risks are not concerned with the performance of a specific party having accepted a corresponding amount of risk. The exchange stands as the intermediary between all parties, perfectly matched, with its only exposure being the credit performance of any one participant. Like Lloyd's, these parties' assets can be attached to secure their performance.

Each system operates on the basis of accepting risks which are common to large numbers of people. As financial transactions and our world in general grow more complex, certain types of risk exposures have become increasingly difficult to transfer in today's markets. In the insurance markets, catastrophic events and judicial reinterpretation have caused a contraction in some types of insurance capacity. It appears that today's insurance markets are frequently unable or unwilling to facilitate the transfer of unique risks such as those with a high possibility of loss, where the loss could come earlier rather than later or with more severity than projected. The exchanges have taken some steps toward addressing unique risks, such as catastrophe futures contracts, but again the terms are restrictive and do not easily integrate with the flexibility of a reinsurance contract. In essence, the exchanges nor mutual funds can accept a single unique risk.

In an efficient marketplace, effective risk management decisions might simply be a matter of a cost/benefit analysis. In practice, such decisions are often driven by the availability and pricing of risk transfer alternatives as well as by regulatory and accounting considerations. Unable to reduce certain types of significant exposures or to find adequate risk transfer alternatives, companies are often faced with a decision to retain exposure to certain risks or transfer only a portion of such risks to existing markets. For these exposures, today's financial and insurance markets often do not provide adequate risk transfer alternatives, the price may be so substantial as to warrant retention, or the ability of the transferee to perform in the event a loss materializes may itself be a concern.

Thus several problems exist which the prior art does not adequately address: i) the ability to transfer a single unique risk of large proportions; ii) access by investors to a system which allows them to accept a single unique risk or diversify their portfolios over a series of such risks; iii) a method of maximum assurance of timely payment to a party transferring risk as well as the segregation of interests of investors accepting such risks; among others.

Accordingly, the present invention addresses these problems by providing a system for transferring risks which are unique or difficult to place in existing markets, for providing investors a system of accepting a specific risk or a diversification of risk, and a means of assuring timely payment and the highest degree of security available.

SUMMARY OF THE INVENTION

The foregoing and other problems of the prior art are addressed by the present invention which comprises a method of utilizing a data processing system and other means to establish a system of statutorily segregated reserve accounts through which compensation received for accepting risk is matched with equity or debt sourced from specific investors, being sufficient to pay a total loss on the maximum risk liability accepted, resulting in an improved capital structure for an enterprise which adopts the system. It provides the highest assurance of timely payment and permits profits and losses of specific risks to be allocated to specific equity or debt providers.

The present invention brings together using a data processing system novel financial management links in a preferably statutorily protected structure which improves upon the underwriting flexibility of an insurance company, risk taking activities of other enterprises, and other attributes of capital leveraging structures with risk and capital matching principles similar to those employed by major international exchanges and mutual funds, in an absolutely secure environment. It permits an entity adopting the system to marshal adequate funds provided by various classes of investors to accept risks not efficiently transferable in existing markets while providing assurance that all claims will be paid from its segregated assets. This arrangement provides a comparatively higher quality assurance of risk transfer. Further, each investor's liability is limited to its investment.

The primary components of the system, in addition to establishing the system on a new or existing business enterprise, are i) the participation of external market specialists; ii) a method of external regulation and fiduciary oversight; and iii) the risk acceptance, risk diversification and reserve management subsystems.

The system provides a unique opportunity for external market specialists to utilize the system supported by the entity's management and support staff.

To provide maximum assurance of the entity's ability to fully and completely satisfy any obligation undertaken thereby, the system is enhanced by modifying the legal structure and certain laws to which the entity is subject, in addition to engaging the services of various fiduciaries, in particular, custodians to maintain certain assets of the entity.

The risk acceptance subsystem of the present invention consists of special statutorily segregated reserves to which premiums (the compensation for accepting risk) are allocated. The system does not limit risk acceptance to risks common to many people nor does it impose the rigid contract limitations of an exchange-based structure. This component permits flexibility in pricing, terms, and limits, except that under this subsystem, any type of risk may be transferred, particularly those which are unique or difficult to place in other markets. Unlike a capital leveraging structure, parties transferring risk are assured of timely payment, as premium and investment income combined with an allocation of capital or debt together are always sufficient to pay a total loss on the risk accepted at the earliest date such loss could occur.

This subsystem relies on the expertise of third party specialists using the data processing system to agree the acceptance of risk. As each risk is accepted, a contract is issued defining specific terms and transactional capital (under the care of independent custodians and sufficient to pay the maximum limit on the contract) is allocated through use of the data processing system to a statutory reserve account to support the agreement being issued. To further protect the interests of contractholders, a "statutory charge", "mortgage", or "security interest" is placed on the assets supporting the contract and is filed with appropriate government regulators.

The risk diversification subsystem of the present invention is comprised of special statutorily segregated reserves to which funds from equity and debt participants are individually allocated. The subsystem protects the individual interests of each risk diversification participant from being impacted by the activities of any other participant through a method of segregating the interests of all participants in the system by a means of statutory reserve accounts created by the data processing system or otherwise.

The present invention goes beyond the flexibility of a prior art exchange by allowing investors not only the ability to accept different types of risks but to participate in risks accepted through a specific contract(s).

The subsystem further provides alternative methods of supporting these risk: through associations of underwriting members with limited liability; through the sale of cash flow interests in the profitability of long-term contracts, similar to royalty interests; single premium deferred annuities (or debt instruments) may be used to support risk taking and investment activities; and those parties wishing to acquire demand guarantees, similar to letters of credit provided by banks, may post collateral to support the issuance of this type of contract.

Finally, the present invention contemplates a core capital structure uniquely different from capital leveraging or capital matching systems individually.

The risk diversification subsystem of this invention represents a unique capital structure. It involves the dissection of capital interests found in other capital structures, permitting the interests of a select group of capital investors' interests to be ranked above the claims of other investors, including secured and unsecured debtholders by means of statutory reform or other means. Most importantly, the interests of those transferring risk to the system have the highest priority and the greatest assurance of payment.

In the present invention investors accept risk through the purchase of unique series of preference equity, whose returns are based on the performance of specific risks or grouping of risks. Risks may also be supported through debt obligations, underwriting members with limited liabilities or through interest in certificates of interest in future cash flows. Each of these forms of transactional capital are allocated, segregated and protected means of the system.

Market specialists who assist these investors acquire interests in what are referred to as "primary equity" (but also bear a resemblance to the capital of a traditional capital leveraging financial institution, a bank or insurance company). These interests are not segregated and constitute capital available to support operating activities, as working capital, or to take positions in risk transactions in a manner similar to transactional capital. All residual benefit in excess of amounts allocated to transactional capital participants, is allocated to primary equity.

The reserve management subsystem of the present invention involves a method of balancing the future cash flow liabilities of accepted risks, with the current interests of capital participants against the backdrop of changing interest rates and credit quality of investment portfolios. It involves a method of maintaining the statutory reserve position of each participant, the collective transactional capital support available to accept new risks in a variety of different currencies, and the liability of the entity to policyholders and other participants, by means of a computer-aided management information subsystem which also monitors the impact of changing interest rates and default rates on the reserves and the entity's capital structure.

BRIEF DESCRIPTION OF THE DRAWINGS

These as well as other features of this invention will be better appreciated by reading the following detailed description of a presently preferred exemplary embodiment taken in conjunction with the accompanying drawings of which.

DETAILED DESCRIPTION OF THE PREFERRED EMBODIMENTS

An Overview of the System

Figure 1:
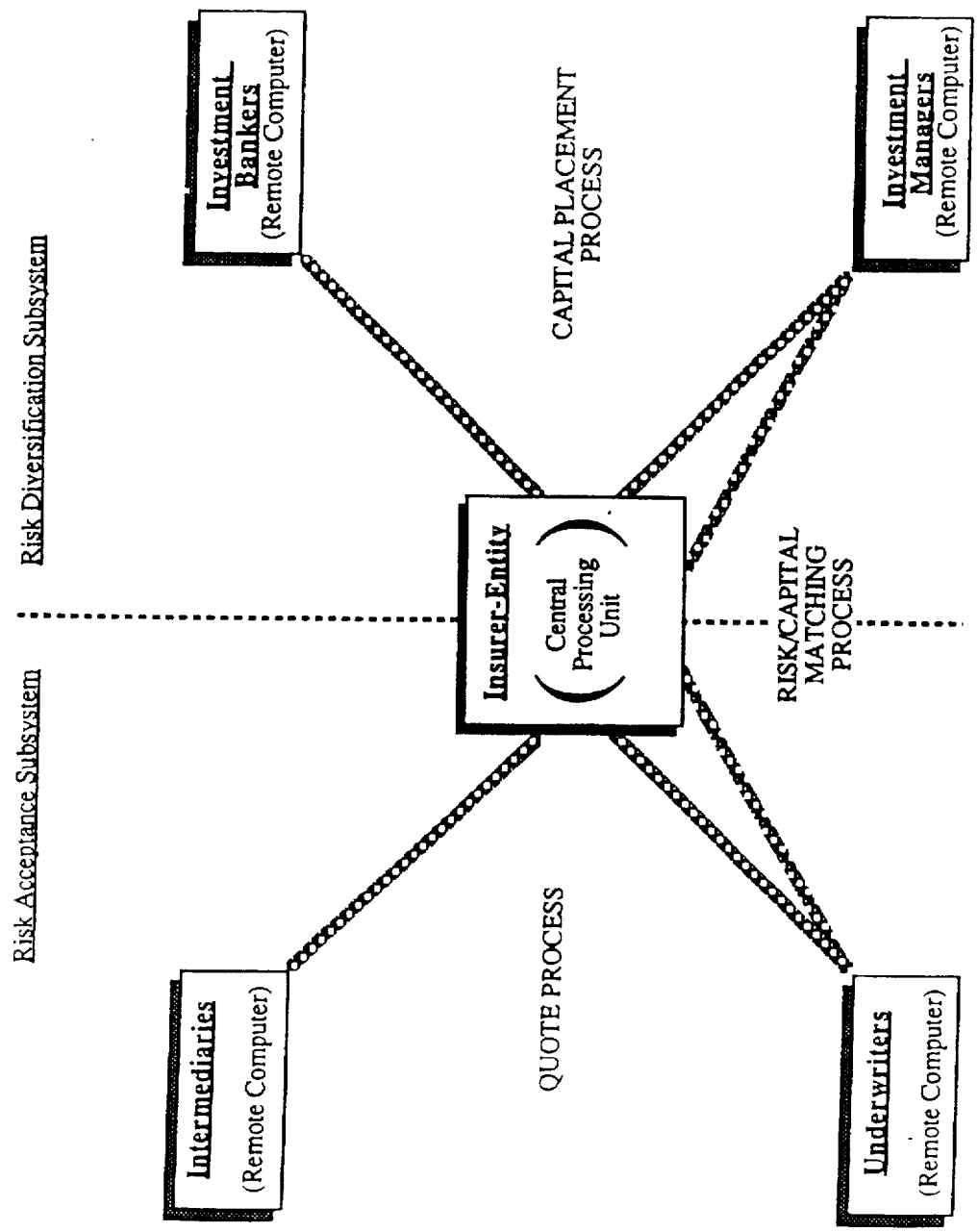
FIG. 1 is a computer hardware schematic.

The present method and system permits parties to transfer any type of financial risk exposure to the risk acceptance subsystem of an entity which has adopted the system, then to provide absolute assurance of timely payment through dedicated transactional capital and premium of the risk diversification subsystem matched to the risk accepted. In the preferred embodiment, an insurance company is the entity which adopts the system, although other enterprises could also utilize the invention.

Under the structure, profits and losses flow through the insurer-entity's risk diversification subsystem, which is designed to diversify risk through several methods hereafter described, which involve the participation of several classes of investors, participating in specific risks. The reserve management subsystem relies on data processing and reporting functions which maintain the risk diversification subsystem at an amount in excess of the risk acceptance subsystem, as well as balancing the values of these subsystems with monetary assets held by fiduciary custodians.

The assets, liabilities and capital of these two subsystems are maintained preferably under a separately established and statutorily protected category of assets, liabilities and capital, referred to as Reserved Assets. The balance of the entity's or insurer-entity's assets, liabilities and capital are classed as General Assets.

The invention imposes an improved capital structure which provides maximum assurance of the insurer-entity's ability to fully and completely satisfy its obligations. In the present embodiment, its continued existence, various restrictions, and oversight are protected by a specially enacted body of legislation which limits or prevents the ability of general creditors to reach or attach reserved assets of the entity and make more difficult action by general creditors to cause the entity to be liquidated.

Specialist Participation

The system is designed to facilitate the activities of various intermediaries or specialists within and outside of the insurer-entity. Parties wishing to transfer risk utilize the services of intermediaries in accessing the risk acceptance subsystem. These specialists approach various underwriters who analyze the proposed risk and bid a price for its acceptance. In some instances, this price can vary from one underwriter to another, as they negotiate with investment managers a percentage of profits and investment return to acquire capital to support acceptance of the proposed risk. Within the risk diversification subsystem, these investment managers have differing costs of capital and investment objectives resulting from the method of capital acquisition and products sold by investment bankers to investors, and allocated to such investment managers. This subsystem provides a means and method of allowing investors to invest in a single risk exposure or diversify their exposure across numerous risks. This may be assisted by specifically designed products whose return is generated from a particular type of risk or profile of allocation, or may be dependent upon the expertise and management of an investment manager. The insurer-entity maintains a staff of competent professionals, similar to an exchange, to assist these external specialists in working within the system.

Intermediaries assist potential risk transferors i.e. entities seeking to be insured against defined risks which risks are normally difficult to place. Examples of difficult to place risks are environmental pollution risks, potential product liability claims (etc.). On the capital side, investment bankers represent capital seeking to assume the risks. The effectiveness of intermediaries and investment bankers on each side of the negotiation is to a great deal based on the data readily made available by the data base system of the present invention as created and maintained by the entity. The entity maintains in its data processing system a list of underwriters and investment managers, and the type of activities in which they specialize. Other data input into the system on a regular basis by participants is A. Data Useful To Underwriters:
  1. Description of capital available to support risks including type of risk and terms sought.
B. Data Useful To Investment Managers
  1. Potential risks to be transferred.
C. Data Useful In Negotiations Between Participants
  1. Offers outstanding.
  2. Counteroffers outstanding.
  3. Standard contract terms applicable to a negotiation.
  4. Information regarding transactions previously completed.

The ready and instant availability of system data for use by all participants including the entity in carrying out the process and method of the present invention provides a system heretofore unknown for matching of unique risks with capital willing to assume such risks based on a premium and other incentives.

Each information retrieval step of the present method facilitates the efficient and timely matching of risks accepted with capital willing to fully assume the risk transferred to the entity on a transaction-by-transaction basis.

Regulatory/Fiduciary Interaction

In the present and preferred embodiment, the system contemplates modifying the normal structure of and laws to which an insurance entity is subject by altering the legislation of the jurisdiction under which the entity is governed. However this method does not serve to limit the means of altering an entity's structure nor restricting the use of the system to an insurance entity. The key provisions of these modifications result in the ability to:

i) issue contracts, which may accept risk, and other legally enforceable contracts, recognized by government as inviolate and not subject to recision on the grounds of reference or other conditions of bankruptcy of any party to such contracts;

ii) record the specific contractual provisions of said contracts, subject to inspection of government;

iii) establish in the records of the insurer-entity statutorily recognized transactional reserves which clearly delineate the insurer-entity's obligations to parties who have transferred risk, investors, and other participants;

iv) transfer assets collectively or individually allocated to such reserves to the custody of government approved fiduciary parties for safekeeping;

v) segregate assets allocated to such reserves from other assets of the insurer-entity, prohibiting except under defined circumstances transfers between reserved and general assets, and further protecting the reserved assets from general creditors of the insurer-entity and prohibiting any change to or use of the segregated assets for any purpose, other than that for which the assets were segregated, by a liquidator or any other party in the event of a liquidation or the bankruptcy of the insurer-entity;

vi) place a "charge", "mortgage", "lien", or other form of security interest on or claim against reserved assets supporting a particular accepted risk to the extent of its total maximum liability and filing an instrument with government recognizing such security interest;

vii) reduce such security interest as the insurer-entity's liability with respect to a contract is diminished, subject to the conditions placed on the insurer-entity by rating agencies or consulting actuaries, and further subject to third party confirmation by independent public accountants or actuaries that after such reduction in segregated assets the insurer-entity is at all times capable of paying its total maximum liability on all contracts issued on a timely basis;

viii) recognize claims and other amounts to be paid out under contract, providing a corresponding payout from reserved assets;

ix) prohibit the insurer-entity from issuing a contract for which it does not have sufficient assets allocated to its segregated reserves to pay the total maximum liability or policy limit of the contract on a timely basis, x) reallocate assets from one reserve to another or to general assets, subject to agreements entered into pursuant to each reserve, said agreements being recognized by government as being inviolate in the event of bankruptcy, liquidation, or claims of general creditors and other parties;

xi) identify and protect the interests of specific investors, one from another, with the capability to distribute profits to specific investors without the governmental restrictions on dividends and capital reduction generally imposed on insurance companies and financial institutions;

xi) extinguish liability of the insurer-entity to a contract party by transferring assets in kind in the event of a collapse of the currency in which the contract is denominated, a moratorium on interest payments by the respective government, or the existence of any other government related default; and xii) limit governmental ability to wind-up the insurer-entity and specifically to preclude any party to petition the liquidation, bankruptcy, or winding-up of the insurer-entity, and further prohibit a liquidator from changing the terms of any contract or agreement or segregated assets allocated to reserves.

The present and preferred embodiment provides an additional means of coordinating the interaction of fiduciary custodians who act to safeguard reserved assets and to assist in claims-paying and other administrative functions; rating agencies who review the insurer-entity's compliance with system requirements, providing an independent assessment of the quality of security currently produced by the system; independent accountants and actuaries who ascertain that the risk acceptance and risk diversification subsystems are constantly in balance assuring the ability to timely meet the maximum of all obligations accepted by the insurer-entity; and the insurer-entity, by way of an integrated agreements between fiduciary custodians and the insurer-entity, subject to government approval. The key provisions of these agreements allow the insurer-entity to:

i) identify fiduciary custodians as well as provisions for changing such custodians, identifying and transferring reserved assets to custodians, and ascertaining that such assets shall be held apart from the assets of each custodian and other parties, in a safe and secure manner;

ii) segregate the notional value of reserved assets held by a custodian into two parts, one representing notional value which is charged or has a security interest placed thereon to support specific contractual obligations, and the second part being the balance of the assets which are not subject to a perfected security interest;

iii) restrict the investment quality and type of securities to which reserved assets subject to a security interest may be invested;

iv) provide claims and other payments from reserved assets subject to security interest, which assures compliance with underlying contractual terms and assures the highest degree of safety and security in the transfer of such payments;

v) change securities representing reserved assets subject to security interest subject to confirmation by rating agency(ies) and accountants or actuaries that the insurer-entity after such change has complied with required provisions and is fully capable of meeting the maximum of its obligations on a timely basis; and vi) recognize a reduction in contractual liability and reducing reserved assets subject to security interest, subject to confirmation by rating agency(ies) and accountants or actuaries that the insurer after such reduction has complied with required provisions and is fully capable of meeting the maximum of its obligations on a timely basis.

Risk Acceptance Subsystem

The risk acceptance subsystem provides a method of transferring risk to the insurer-entity. The insurer-entity uses contract forms language as inputted in the data system which contain standardized legal clauses, claims payment and administrative provisions, but also offer a substantial amount of flexibility in describing coverage, terms, limits, and pricing for risks being assumed.

The method and system of the present invention is not limited to acceptance of risks common to many people nor does it impose the rigid contract limitations of an exchange-based structure. Risks accepted by the insurer-entity could include credit and liquidity risks on corporate and municipal government debt and lease obligations which are unrated or non-investment grade, thereby substantially increasing their liquidity and market value. The insurer-entity is also capable of indemnifying insureds for loss on a change in value of marketable shares, agricultural products, precious metals, petroleum, fluctuations in interest or currency rates, or residual value. It could issue ICC #458 demand guarantees, similar to a letter of credit issued by a bank, or other performance or surety risk contracts; or accept any type of traditional insurance risk, as well as unique or difficult to place risks, such as catastrophe, excess or aggregate exposures, liability or contract risks, or unfunded potential exposures (pollution liability, etc.).

The present component improves flexibility in pricing, terms, and limits, permitting any type of risk to be transferred, particularly those which are unique or difficult to place in other markets.

The risk acceptance subsystem relies on the expertise of third party specialists to agree to the acceptance of risk. These parties will use presently available data processing hardware including computers, modems, personal digital assistants, and other types of hardware as it becomes commercially available to transfer information electronically, whether voice, video, data or other form. (FIG. 1), all as provided by the data processing system.

Intermediaries coordinate the activities of brokers and parties wishing to transfer risk. Intermediaries develop an expertise in specific products and in analyzing customer needs; form relationships with underwriters understanding their respective underwriting capacities and interests; negotiate coverage, terms and limits for prospective insureds; and keep abreast of new products as they become available.

Figure 2:
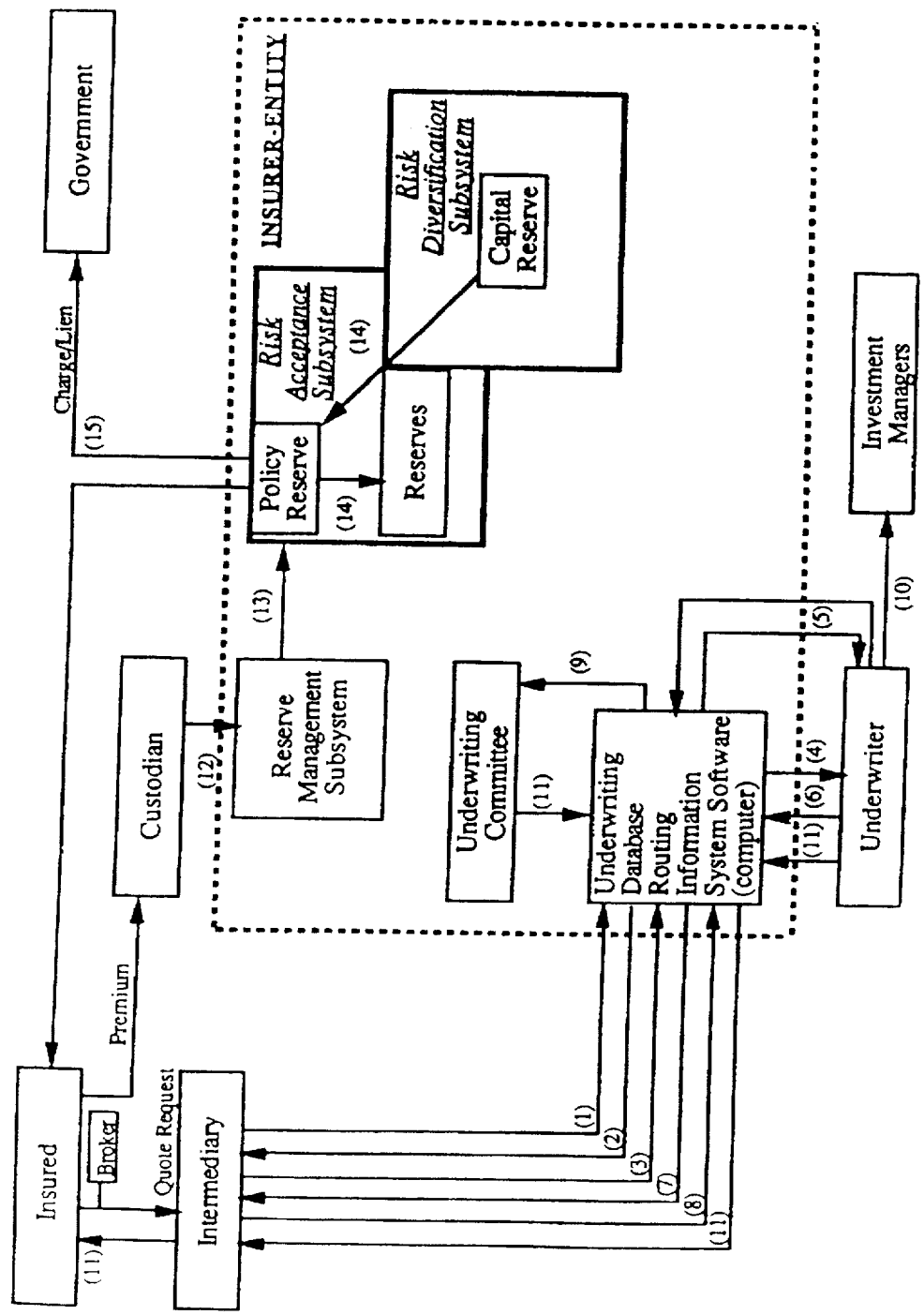
FIG. 2 is a flow diagram of the steps for issuing a contract accepting risk.

A data processing means of electronically communicating, inputting and retrieving information regarding a proposed transfer of risk by an intermediary to one or more underwriters is provided. (FIG. 2) An intermediary inputs prescribed information concerning a risk into a data processing system which electronically transmits same to an insurer-entity's underwriting database router for comparison.(1) Once the information is electronically compared to a series of discriminating parameters, the router system responds with suggested programs and underwriters to whom the information could be provided for a quotation. (2) Unless the intermediary bypasses the previous step by pre-selecting an underwriter to receive the information, the intermediary selects one or more underwriters to whom the routing system then forwards the request for quotation.(3)

An underwriter may be a firm of professionals contracted for a particular type of expertise, a traditional insurance company in which the insurer-entity reinsures risks underwritten by the insurer's underwriting staff, a bank or other risk management professional who is experienced in risk analysis, acting in a manner similar to a market specialist on a major exchange.

The underwriter's primary task is the analysis of risks, establishment of policy limits, determination of appropriate premiums, and recommendation of policy issuance. Upon receipt of a request for quotation,(4) a detailed report analyzing the proposed risk is prepared with the assistance of a data processing program which compares the proposed risk to a set of underwriting guidelines broadly designed to assure compliance with specific program objectives, capital matching limitations, and system constraints. A key element of this comparative data system is an interactive pricing model which takes into consideration program guidelines, current and projected market interest rates, an assessment of projected losses, equity and debt return expectations, various cost and profit objective factors and other information necessary to determine the amount of capital matching support required to accept the proposed risk and the minimum premium level which would justify its acceptance. It also analyzes the underwriter's current portfolio of business and capital matching capacity.(5)

The underwriter may then respond via electronic means as to whether or not the underwriter is prepared to recommend the acceptance of the risk and at what price.(6) Since various underwriters may tailor their programs differently, more particularly the diversification profile of risks they assume, their cost of capital matching (returns investors expect for the use of capital allocated to risks underwritten by an underwriter), costs of underwriting, and profit expectations can vary substantially. Thus requesting a quote from several underwriters may result in a variety of preliminary indications.

Once an intermediary receives indicative coverage terms, limits and premium,(7) a decision may be made to submit an electronic application to a particular underwriter for the transfer of a proposed risk.(8) Upon receipt, the proposed risk is reprocessed through the program producing a report which includes all pertinent analytical factors as well as final terms, coverages, limits and premium. An underwriting fee and expense component is applied, reserve levels for maximum risk exposure are computed, and a capital usage profile is developed, resulting in the premium to be charged. This report is then submitted to an internal underwriting committee of the insurer-entity for consideration.(9)

Each underwriter is responsible for negotiating the cost of capital and the capacity to support the acceptance of risk. The internal staff of the insurer-entity may assist the underwriter in these efforts. At this point the risk acceptance subsystem interfaces with the risk diversification subsystem to optimize returns for various classes of investors within the system.(10) This process is further described hereafter in the risk diversification subsystem.

Once final terms are approved by the underwriting committee, which includes internally identifying and earmarking capital capacity to support the acceptance of the risk, the underwriter electronically issues a binding commitment, subject to receipt of the premium.(11)

The insurer-entity, having previously established a statutory premium collection reserve for the acceptance of premium, instructs that premium be wire transferred to a particular custodian for the benefit of the insurer-entity and allocated within a specifically identified statutory reserve account.

Upon confirmation of receipt of premium from the custodian,(12) the insurer-entity's administrative staff inputs the underwriting committees approval code for the particular risk in the data processing system, which commences an automated policy/contract issuance procedure.(13)

As a result of having inputted the original quote request data, and the underwriting committee's action thereon, all information relative to the final binding commitment is contained within the data processing system's policy information database, including the committee's approval code. The system, upon input of the wire transfer confirmation code and amount by the custodian who is linked into the system via computer hardware and modem, and input of the underwriting committee's risk acceptance authorization code, the system creates a series of statutory reserves within the accounting records of the insurer-entity.(14)

Each segregated reserve is a separate account or ledger established by the insurer-entity to allocate the interests of policyholders, capital participants, professionals and for other purposes, which permit the insurer-entity, fiduciaries and regulators to ascertain that the insurer-entity can at all times satisfy its obligations to all parties. These may take the form of policy reserves, capital reserves, and administrative reserves. Monies held by custodians are allocated across these reserves, being tracked electronically by the data processing system.

Prior to issuance of each policy, sufficient funds, including premium and capital, are electronically allocated to these statutory reserves to pay a maximum loss under the policy on a timely basis, as well as certain administrative and professional fees over the life of the contract. The program then issues the policy, with appropriate terms, as well as a "statutory charge" form which is filed with government.(15)

In the event a loss occurs under the terms of a policy or the insurer-entity is otherwise required to make a payment under the terms of a contract, the policy terms will determine specific documentation which must be provided the insurer-entity or a custodian as its paying agent. Once received and verified for compliance with policy provisions, the custodian will make such payment, reducing the amount of funds allocated from the appropriate reserve supporting the specific policy. The insurer-entity will have instituted within its custodial agreements a method of investment which assures that securities held to support these policies mature into liquid form available for payment at the earliest date a disbursement might be required under each policy.

The data processing system of the present invention provides novel methods for accomplishing the matching of persons seeking to transfer risks with capital willing to accept such risks. The data processing system is created and maintained by the entity including terminals serving the entity and specialists associated with the entity, all as administrated by management of the entity including the underwriting committee. Links between terminals may include fiber optics, cable, satellite, microwave or other video, data and voice transmission methods with such interface devices to permit the system at all ends to effectively communicate. The data processing provides instant access of pertinent information to facilitate the negotiation of terms to match risk transfer to capital on a contract-by-contract basis. System information generally includes (1) lists of specialists representing risk transferors i.e. intermediaries, (2) specialists involved in analyzing and pricing the acceptance of risk, i.e. underwriters (3) lists of investment managers and investment bankers and descriptions of what risks transferors are looking to transfer and what capital is available to accept such risks and finally (4) forms of contractual agreements and appropriate legal clauses.

Risk Diversification Subsystem

The risk diversification subsystem (FIG. 5) is a multifaceted diversification mechanism, which when viewed from different perspectives may look similar to existing structures, but taken together in overview form is uniquely different to any diversification methodology in existence, representing a totally new method of diversifying risk.

The present subsystem diversifies risk through a means of matching specific risks with sufficient funds, including capital, to permit complete risk transference, while transferring risk to and diversifying it across numerous investors. An attraction of this method is the ability to obtain larger compensation, i.e., premiums, for accepting risks unable to be placed in other markets compared to that accepted by existing markets, and passing a portion of that risk compensation through to investors accepting the risks. This risk diversification system is an improvement over existing methods.

Under the risk diversification subsystem of the present invention, the method of diversification operates such that in addition to premium and investment income, the insurer-entity sets aside sufficient additional funds to be capable of paying a total loss on each risk assumed, without any reduction of policy limits or drop down provisions from those initially contracted. The types of risks assumed are risks which may be unique or of limited number. The insurer-entity must then diversify that risk by transferring it to investors or through other techniques described hereafter.

Under the present subsystem, the insurer-entity is also able to accept credit and performance risk, generally for periods much longer than banks in that the collateral it accepts or the capital it obtains from investors to support these risks is sufficient to absolutely assure its ability to pay. Hence, single risk limitations are not a concern as it effectively transfers the risk to investors leaving investors to accept a single risk or spread their exposure across numerous risks, just as on an exchange.

The present embodiment wholly matches the maximum exposure with funds to support the risk. It will not accept the counterparty risk of an investor who promises to invest more if losses exceed the initial investment or the risk of failure of a reinsurer to pay if called upon. Secondly, investors have a variety of choices, like on an exchange, of the specific risks they assume, can rely on underwriters or investment managers' underwriting allocation performance to diversify their portfolios, or select their own diversification profile.

Figure 3:
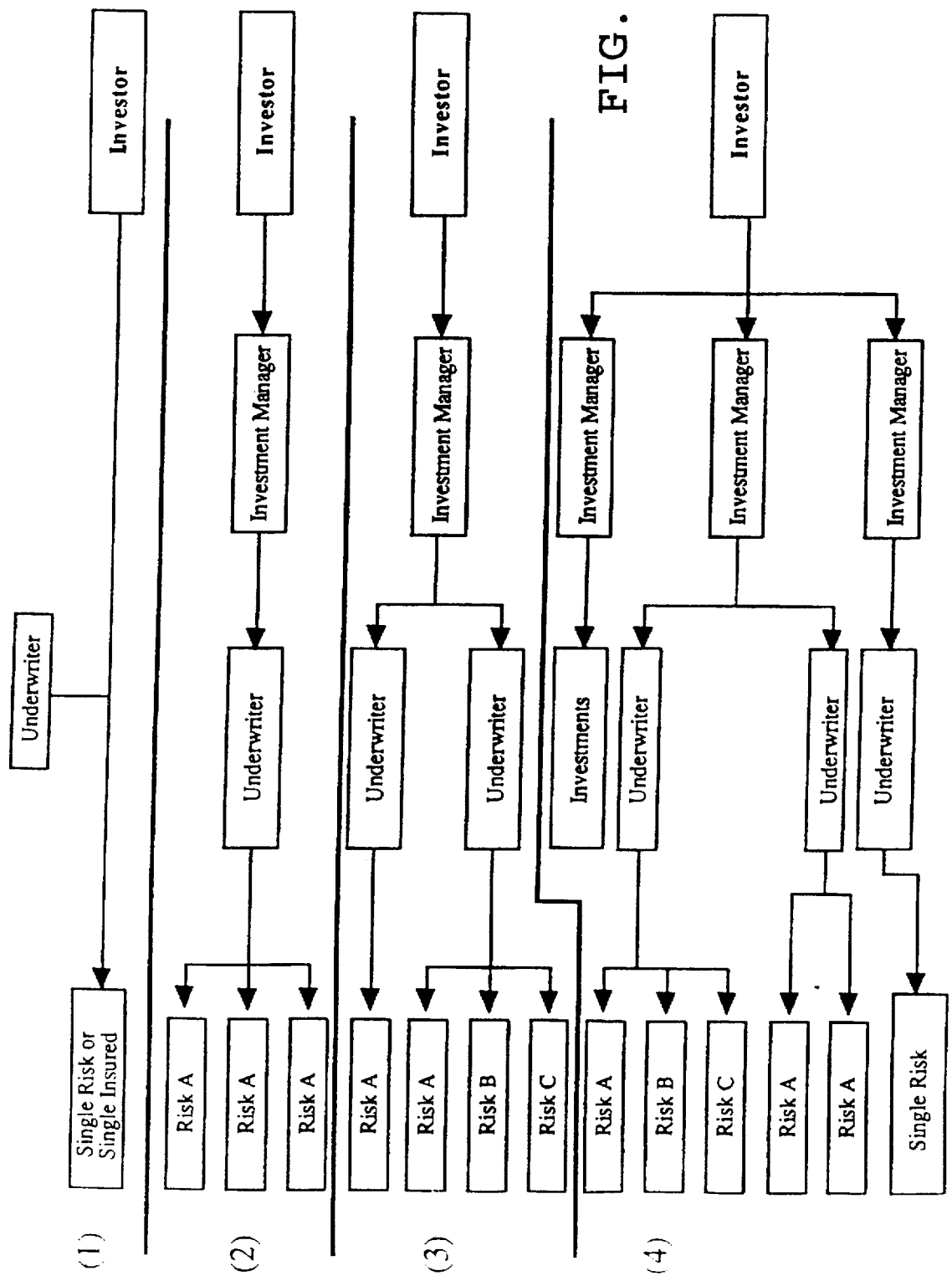
FIG. 3 is diagram of several transactional capital asset allocation options available in the present invention.

Diversification through asset allocation may be employed by an investor in the present invention (FIG. 3). An investor may assume a single type of risk exposure allocating funds to an underwriter,(1) directly or through an investment manager, to be used in a program, which assumes numerous risks of similar type.(2) Unlike the mutual fund, the investor has more flexibility in that he may request an investment manager allocate funds to more than one underwriter,(3) diversify the investment across numerous risks, use more than one investment manager, or any combination of options.(4)

The subsystem of the present invention does not permit margin as on an exchange, but does provide investors the flexibility to accept all types of financial risks, through contracts which may be unique or standardized. Investors with different risk tolerance levels can accept different layers of risk represented within a single contract. The mechanism fully employs matching principles which permit it to accept any type of risk, where exchanges must standardize contract risk terms, exchanging large numbers of similar risks. The subsystem permits diversification of risk to be structured in a variety of contractual formats, providing greater flexibility for both risks transferred and means of diversifying same.

The present diversification methodology offers unique improvements over the prior art. Three primary constituencies are hereafter considered: a) owners or sponsors of an enterprise; b) the investors, lenders, reinsurers, or other risk transferors who use these structures; and c) the professionals, employees and/or specialists who provide the day-to-day risk acceptance, transfer, and administrative activities.

Figure 4:
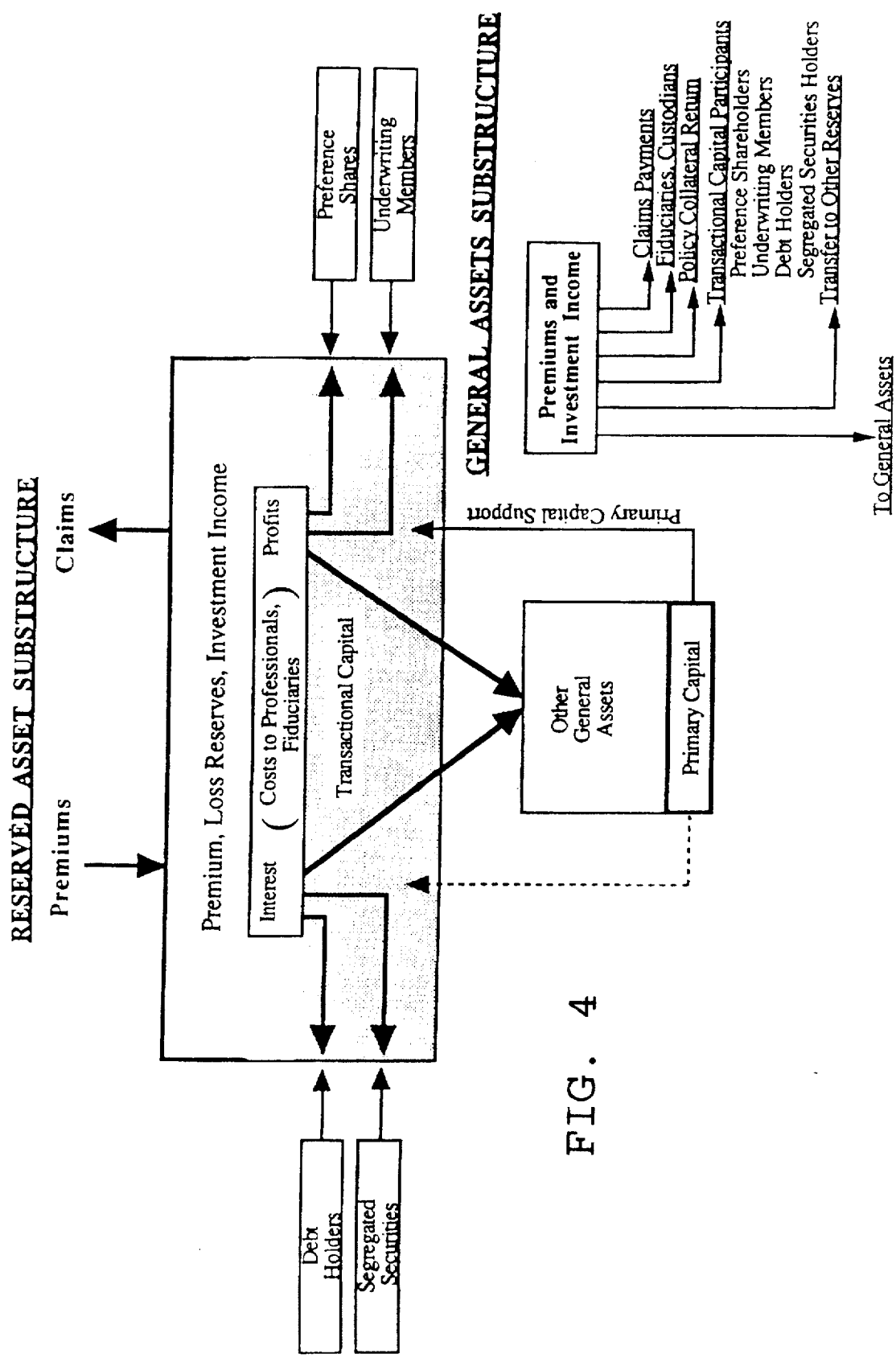
FIG. 4 is a schematic of the General Assets and Reserved Assets substructures.
Figure 6:
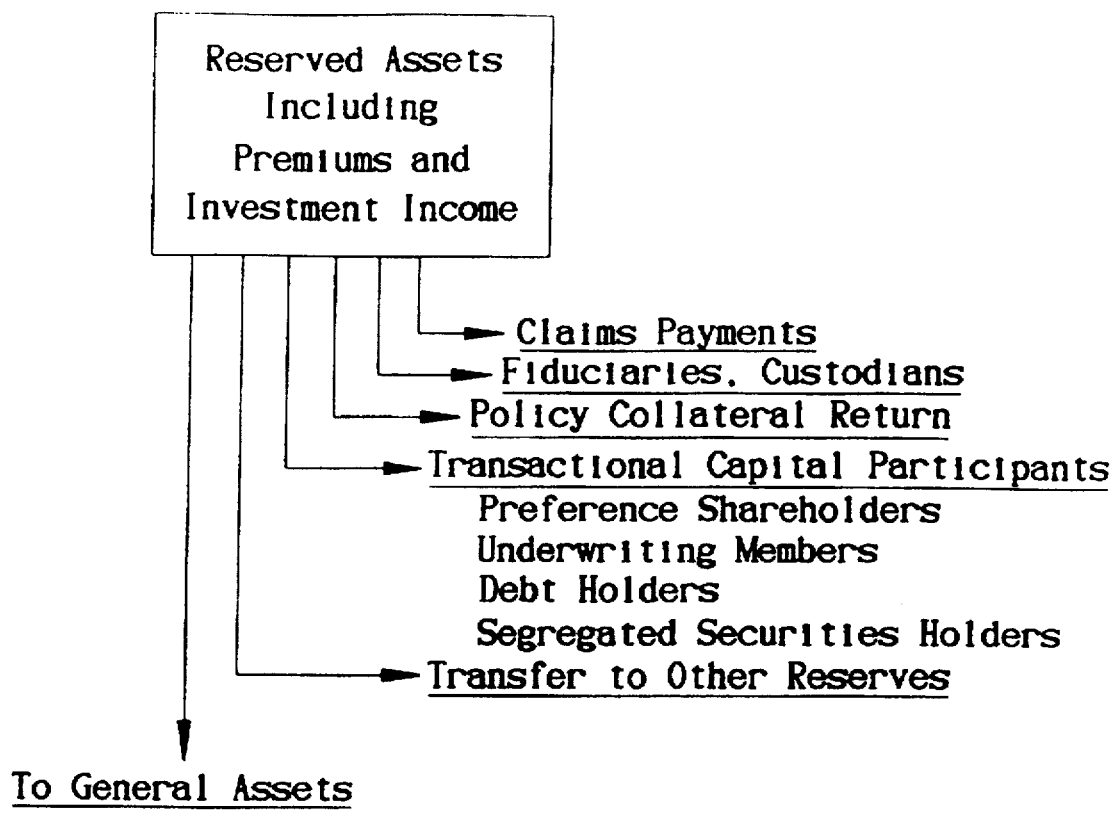
FIG. 6 is a flow diagram illustrating preferences in the reserved assets.

The risk diversification subsystem of the present invention substantially improves the benefit and flexibility for each of these three constituencies. The present invention improves the capital structure of the insurer-entity by means of creating and embodying in law two distinct two financial statement constituencies. Generally, the priority of claims upon assets and income of an enterprise begins with senior lien debt, then junior lien debt, general creditors, preferred shareholders and finally common shareholders. The present embodiment involves two priority structures coexisting; both representing assets, liabilities and capital of the insurer-entity, not simply assets being held in trust. These are distinguished for exemplary purposes as "General Assets" and "Reserved Assets" (FIG. 4).

a) owners or sponsors of an enterprise—The General Assets of the insurer-entity are invested at the enterprises discretion. Liabilities it assumes are ranked in the priority for regular enterprises. In the present invention the owners are represented by a combination of common or preferred shares, the difference primarily being certain voting rights attached to the common shares, although a variety of combinations is also possible. The results of operations transferred to General Assets serve to pay operational expenses of the insurer-entity, reduce or eliminate general liabilities, and finally inure to the benefit of shareholders, hereafter termed "Primary Shareholders".

b) the investors, lenders, reinsurers, or other risk takers who use these structures—General Assets may be transferred to Reserved Assets or third parties can deal directly with the insurer-entity through its Reserved Assets substructure, without going through the General Assets substructure. The initial difference in the two substructures is the security aspects afforded Reserved Assets. By statutory means, the priority of claims upon assets is altered. The insurer-entity can subdivide Reserved Assets into any number of accounts for tracking the insurer-entity's obligations to various parties including to its General Assets substructure, providing ease of regulatory inspection and reporting. The insurer-entity upon creation of an account within its books of account prepares a document setting out the uses and purposes of the account; records the quantum of funds allocated to the account, the maximum period such funds may remain allocated thereto, any compounding rate at which additional funds might be credited to the account, and types of investment risk to which such funds could be subjected; the type of risks and/or parties for whose risks such funds could be supportive; the terms under which funds could be reallocated to other reserve accounts, for allocations representing professional fees, administrative fees, returns of collateral, reductions for transfers to participants hereafter referred to as "transactional capital participants", and transfers to General Assets (FIG. 6). Upon the issuance of a policy, the insurer-entity takes the additional step of placing a "security interest", filed with government, on a portion of the insurer-entity's Reserved Assets, which has the effect of blocking the reduction of any funds allocated to a reserve account, except for payment of claims or contractually obligated payments, until a reduction of liability is properly certified. Reserved Assets are thus subject to specified use, protected from the claims of general creditors in the event of a liquidation or bankruptcy of the insurer-entity, and may only be used as per the instructions attached to each reserve account.

The substructure further involves the placement of securities and other assets identified as Reserved Assets in the care of government approved financial custodians. Although specific securities may be identified to specific reserve accounts the present embodiment anticipates the assets allocated to such accounts will generally represent a portion of the assets maintained as Reserved Assets, held by several custodians.

Through the Reserved Assets substructure the insurer-entity conducts its risk acceptance and investment activities. For each risk accepted, in addition to premium and future investment income, there must be allocated to a reserve account additional funds permitting the insurer-entity to place a lien on Reserved Assets identified to funds allocated to a specific reserve, sufficient to pay the maximum liability under the contract/policy on a timely basis. These additional funds are sourced from transfers from General Assets or from transactional capital.

Transactional capital is defined to include debt, equity and various other forms of capital raising instruments. The risk diversification system of this invention contemplates the issuance of adjustable rate debt or annuities directly allocated within the insurer-entity's Reserved Assets substructure to support risk acceptance and investment activities. Revenue generated from these activities is used to satisfy obligations to these participants. Payments received by them are accounted for as interest and return of principal on the books of each party. The insurer-entity in assuming debt within its Reserved Assets substructure always has sufficient funds set aside to pay its fixed obligations under such instruments or is capable of converting such instruments to an interest in future cash flows, preference equity or some other form of financial instrument. Revenues in excess of payments to debt/annuity participants, less certain professional fees and expenses, may remain within the Reserved Assets substructure for the benefit of primary shareholders or be transferred to the General Assets substructure for further use or distribution to primary shareholders.

The present subsystem permits investors to provide funds to support risks through a method of individual investors acting as reinsurers, where the insurer-entity credits premium, loss reserves, investment income, etc. to the account of the investor. In some jurisdictions, investors, whether individual or corporate, may be able to book these transactions as reinsurance transactions, accepting premium income and expenses, less losses, having some tax related or accounting advantage. Liability may be limited to a deposit advanced by the investor or may be unlimited, however the insurer-entity maintains at all times the ability to fully meet the maximum obligation. Revenues generated after appropriate payments to these transactional capital participants again may remain within the Reserved Assets substructure for the benefit of primary shareholders or be transferred to the General Assets substructure for further use or distribution to primary shareholders.

The subsystem is also designed to permit the sale of the effect of reductions in liability emanating from a particular reserve account, or any number of derivative type instruments representing portions of future cash flows of Reserved Assets. These segregated securities are sold to investors, with the sales proceeds remaining within the Reserved Assets substructure for the benefit of primary shareholders or be transferred to the General Assets substructure for further use or distribution to primary shareholders.

The present subsystem provides the ultimate in equity flexibility through the issuance of preference shares tied to business conducted through the Reserved Assets substructure. These preference shares permit investors to design the terms of their investment. Funds generated from the sale of a particular preference share series to one or more investors are allocated to an investment reserve account then may be transfer allocated to an underwriting reserve account, then used to support a specific risk or risks of a particular entity. Funds allocated to an underwriting reserve may be permitted to support a number of similar risks, or a variety of risks. They may be used by one underwriter or allocated to numerous underwriters. Funds allocated to investment reserve accounts may be managed by one investment manager or spread among a number of investment managers. These investment managers are responsible for overseeing the investment of funds in permitted financial instruments as well as allocating same to underwriters for risk acceptance purposes. Funds invested through preference shares are subject to specific shareholder agreements regarding the method of allocated profits and losses to the series, dividend policy, designated investment managers and underwriters, redemption provisions, and other pertinent provisions. Revenues remaining after dividends to transactional capital preference equity participants may remain within the Reserved Assets substructure for the benefit of primary shareholders or be transferred to the General Assets substructure for further use or distribution to primary shareholders.

c) the professionals, employees and/or specialists who provide the day-to-day risk acceptance and transfer activities. Finally, the present invention provides for the involvement of internal management and staff of insurer-entity as in a capital leveraging structure, combined with third party professional specialists. The present embodiment has the objective to maintain a sound and orderly marketplace, permitting capital participants easy access to accepting and assuming risks on the exchange, and third-party specialists the ability to facilitate trades for a fee and in some cases to trade for their own accounts. Primary shareholders' focus is on management's causing the collective resources of the enterprise to generate a profit for them as the owners of the enterprise.

Transactional capital equity participants also have an ownership interest in the enterprise, albeit restricted to a portion of assets and revenues identified by reserve accounts and shareholder agreement. These shareholders expect best efforts will be made to maximize their return on investment, as well.

These two positions create a marketplace tension designed to permit the compensation for risk taking allocated between primary shareholders and various transactional capital participants to seek a negotiated level.

Intermediaries bring prospective risk transfer participants to the risk acceptance subsystem, while investment bankers bring prospective investors to the risk diversification subsystem, whether the General Assets substructure as a prospective primary shareholder or to the Reserved Assets substructure as a prospective preference shareholder, debt/annuity holder, underwriting member, or segregated securities holder, collectively, transactional capital participants. There compensation is generally commission oriented.

An underwriter's role is to maximize the premium received for the acceptance of a particular risk, while taking all prudent actions to minimize the possibility of future losses. However, in obtaining additional funds above premium and investment income to support a risk, it must obtain those funds from primary shareholder capital allocated by management and/or transactional capital allocated in some cases by investment managers. Since in the present embodiment, an underwriter's compensation is based on a recovery of underwriting expenses and an underwriting profit commission, which deducts compensation paid for the use of transactional capital as an expense, a designed tension exists for underwriters to negotiate downward the cost of Transactional Capital. This benefits both the underwriter, primary shareholders, and the administrative staff of the insurer-entity.

The role of investment managers is to maximize profitability on Reserved Assets sourced from transactional capital participants, by increasing the return paid on or percentage of profits received for the use of transactional capital funds. These investment managers can negotiate with Underwriters to place Transactional Capital in support of various risks. This may be by way of providing capacity for an annual underwriting program or bidding on capital to support a specific risk. Underwriters may seek capital support from a number of investment managers, or in some cases direct from transactional capital participants. Investment managers are compensated by management fee and in some cases a percentage of profits above an agreed level.

The administrative staff of the insurer-entity has a unique role. Although seeking to manage the enterprise more similar to an exchange than an insurance company, promoting the involvement of transactional capital participants and generally encouraging a marketplace usage approach to the acquisition of new business, its primary focus, is the facilitation of capital matching between underwriters and investment managers, for the benefit of primary shareholders. This unique dynamic is stimulated by an internal system allocation of a portion of revenues attributable to primary shareholders, to the administrative staff of the insurer-entity. Through managing the capital and surplus allocated to primary shareholders, the administrative staff can under certain constraints, interject primary shareholder capital to support a particular risk if the staff or the underwriter is of the opinion the compensation sought by investment managers for transactional capital support of a risk is excessive.

Figure 5:
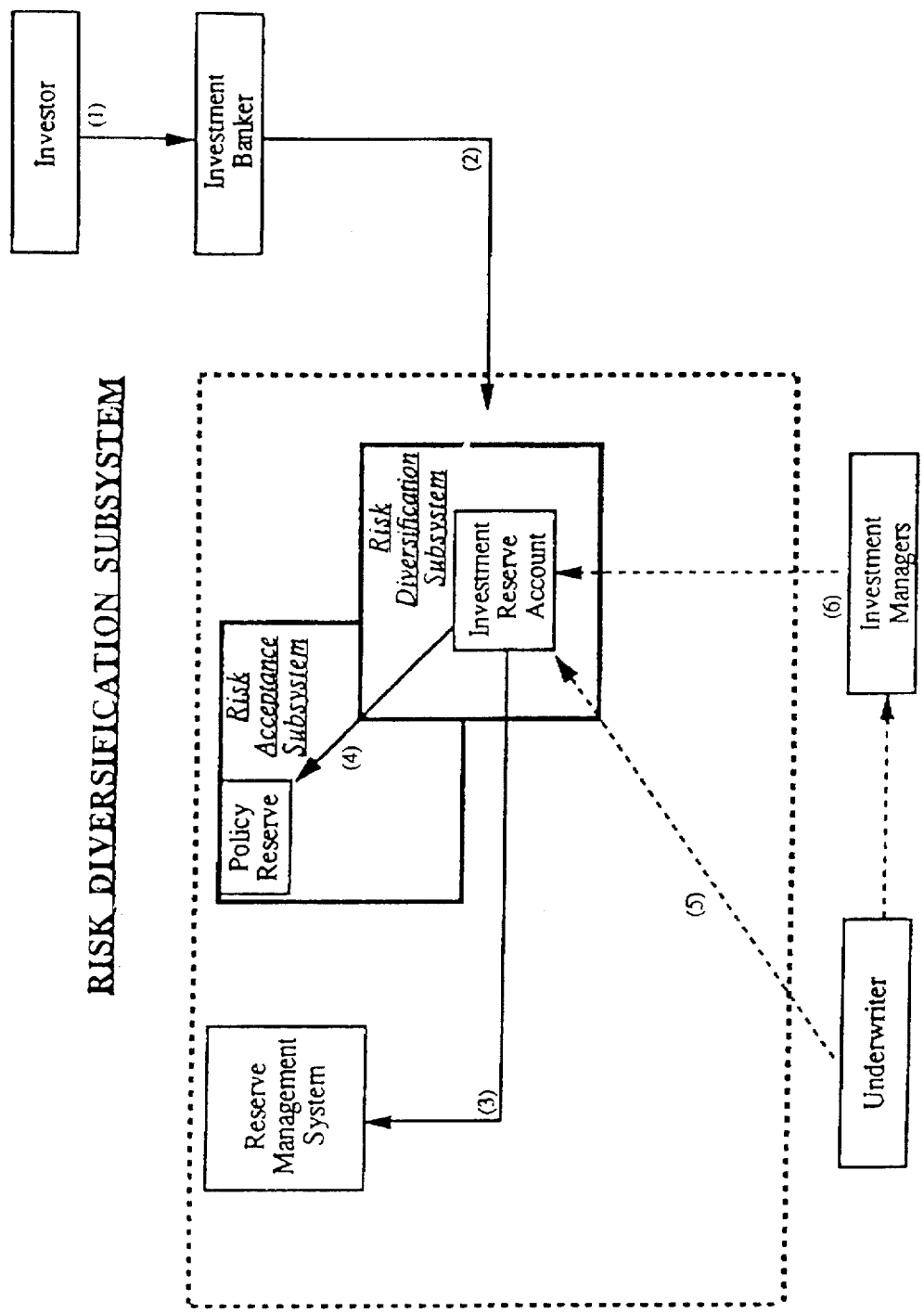
FIG. 5 is a flow diagram of the steps for accepting capital or debt, and the management system for allocating funds to the support of specific risks or investments.

The following examples serve to further explain the unique co-existence of both transactional and primary capital within the present invention (FIG. 5).

I. Transactional Capital Participants

In the preferred embodiment, a transactional capital participant, (1) generally through the assistance of an investment banker, transfers funds to the insurer-entity for allocation to a specific investment reserve account. (2) This reserve may have been created for the specific participant, or may represent the interests of a number of similar participants.

Each reserve is subject to an agreement within which are contained the use and allocation parameters of the reserved assets; the credit quality and form criteria to which such reserved assets may be subject, including the underwriting or other investment risks to which the funds may be allocated and diversification profiles; investment managers and/or underwriters to whom the funds may be appropriated; the duration of the reserve, the method of allocated profits, losses, and return of funds provisions; as well as a host of other similarly restrictive criteria.

In transferring funds to an insurer-entity, a transactional capital participant may receive any of four financial instruments emanating from the Reserved Assets substructure: i)

preference shares, ii) debt/annuities, iii) underwriting member contracts, or iv) segregated derivative securities. Each reserve account may have funds allocated through any one of the above or a combination thereof.

Upon creation of a reserve account within the risk diversification subsystem, its parameters are input to the data processing system of the reserve management subsystem. (3) Once funds are transferred to the insurer-entity, the terms of its acceptance are input into the same system, which checks the arrangement for compliance with reserve criteria.

The flexibility of the present invention allows transactional capital participants a host of options. These permit minimum diversification, where the participant accepts a single risk allocated to one reserve account, or maximum diversification where the participant's funds are spread between many reserve accounts, each managed by one or more investment managers, supporting multiple underwriters, in a variety of risks. The system truly provides participants the ability to structure a risk profile within their tolerance objectives.

A Transactional capital participant may limit the use of funds transferred to supporting a single risk, (4) risks of a particular enterprise, risks underwritten by a specific underwriter (5) or a group of Underwriters; or may identify one or more investment managers, (6) who will be responsible for allocating said funds within participant guidelines or within those the investment manager(s) has previously established for other funds under its management. These funds may be allocated to any number of insurance underwriting and investment activities of the insurer-entity.

Underwriters completing their capital support profiles for the acceptance of a specific risk or for annual program capacity to write a particular type of risk, negotiate preferably using the data processing system, a portion of future profits or agree on agreed rates of return for funds to support these risks. With the assistance of the insurer-entity's internal staff, these opportunities are electronically sent via the data processing system to selected investment managers. Alternatively, an underwriter may deal directly with prospective transactional capital participants.

These parties negotiate the terms under which the funds will be used, subject to insurer-entity management review of program and reserve compliance. Final information of such negotiations is then inputted into the data processing system.

EXAMPLE 1

An entity known as the Front Street Corp. is created to act as a vehicle for issuance of a plurality of insurance policies with each policy backed by a segregated reserve accounts which accounts are protected by law. Front Street Corp. employs a data processing system with terminals at its place of business and at the places of business of intermediaries at locations in numerous cities throughout the world representing potential policyholders and potential transactional capital contributors. Front Street Corp. inputs information into the data processing system to create various capital, risk acceptance and administrative reserve accounts. Further data inputted into the data processing system includes lists of intermediaries, potential risk transferors, and potential capital contributors, each ready to engage in practicing the method and system of the present invention. Finally proposed policy language is inputted and stored. Intermediaries utilize the system to negotiate a proposed policy for the entity to issue backed by specific dedicated capital which capital must be adequate to satisfy the policy limits. The offers and counteroffers of negotiations are inputted and stored in the system for instant retrieval.

When a proposed policy is agreed upon among intermediaries representing their principals using the system Front Street Corp. then reviews all aspects of the policy and particularly the adequacy of the capital to be provided, evaluates the proposed policy. Front Street Corp. then approves or disapproves the proposed policy. If the entity approves the policy, the capital funds are first placed in the segregated reserve accounts before the policy is issued. After issuance, all pertinent data is inputted in the system ready for potential claim administration.

EXAMPLE 2

This procedure is further illustrated by the following example. A national building materials manufacturer/supplier observes that when catastrophic events occur the price and profitability of the building materials it sells increases. It also determines that immediately after such events the price and capacity for property catastrophe insurance coverage often dramatically increases, for several years after the event. During the same period, building materials prices often decline due to an oversupply generated by the previous shortage caused by the catastrophic event. The property insurance industry and the building materials industry both experience cyclical trends caused by a catastrophic event, but one often lags the other.

The materials supplier decides to transfer $100 million to the insurer-entity, as a transactional capital participant, to support certain types of property catastrophe risks, capacity for which may not be available or becomes very expensive after a catastrophic event. The material supplier decides to limit its support to risks located primarily in geographic areas where it does most of its business. Its rationale is that if losses occur in these areas due to a catastrophic event, it will likely realize profits from building materials sales, thus maintaining a natural hedge for its risk taking losses. Unlike traditional insurers, who then attempt to recover their losses through substantially increased premiums in subsequent years, these increases theoretically could provide substantially improved earnings for the building materials supplier in years where its materials profits are under pressure from an oversupply in the marketplace, post catastrophic event.

To achieve a similar objective, the prior art would only permit the materials supplier to invest in the shares of an insurance company established specifically to accept property catastrophe risks or to buy lumber or property catastrophe futures contracts. The latter may involve a substantial amount of volatility, requires a thorough knowledge of the risks of taking futures positions and is not as appropriately matched for natural hedging purposes. The costs can also be somewhat prohibitive. Investing in the publicly traded shares of a property catastrophe insurer does provide another option, however the volatility of price and direction of movement may not coincide with the geographic distribution of risks to which the materials supplier would normally profit. For instance, large losses resulting from a catastrophic event insured in another country could precipitate a decline in the value of the publicly traded shares of the property catastrophe insurer, with no corresponding building materials sales benefits. The supplier would also be subject to decline in the price of shares, in those years in which an oversupply of insurance capacity existed, as often occurs in the cyclical property insurance markets.

The present system provides for a means of permitting the supplier to indirectly participate in the property catastrophe market when insurance capacity is limited and premiums are high, and be out of the market when rates are low and capacity in abundance. This is accomplished by the supplier's selecting an investment manager to annually allocate the supplier's transactional capital funds transferred to the insurer-entity, based on prescribed guidelines. For instance, the reserve agreement require the $100 million be invested in short-term government securities while supporting insurance risks. During those periods where the investment manager elects not to support insurance risks due to low premium levels, a variety of alternate investments might be permitted, thus maximizing potential returns on the supplier's transactional capital.

Since the supplier has little expertise in assessing property catastrophe risks or negotiating these types of risk acceptance contracts, the reserve agreements permit the investment manager to negotiate with one or more underwriters to support specific risks or programs. For instance, the insurer-entity may contract with a property catastrophe insurer as an underwriter. The investment manager might allocate funds to reinsure risks the underwriter, as a property catastrophe insurer, accepts from geographic areas which match the supplier's sales profile, or rely of the underwriters expertise to analyze risks presented by other insurers or companies with exposures in the prescribed geographic areas.

The system offers a unique ability to custom tailor the risk taking parameters a transactional capital participant supports, and the investments the insurer-entity makes with said funds, optimizing return for the participant.

II. Primary Shareholders

Management of the insurer-entity is charged with the responsibility of providing catalytic assistance to various market participants in risk taking and capital matching activities. The insurer-entity, similar to an exchange allocates a minimum fee level in each transaction, similar to fees charged by exchanges.

As in Example 2, the internal staff of the insurer-entity would assist underwriters and investment managers in efficiently optimizing the material suppliers investment within agreed parameters.

However, the system permits the insurer-entity, unlike exchanges, to actually participate in risks assumed, through allocation of Primary Share capital in conjunction with or in lieu of transactional capital, under certain conditions. Management of the insurer-entity monitors the pricing of risks being transferred to transactional capital participants. If compensation levels seem to be excessive, management may opt to place a competing bid, generally allowing transactional capital to match the bid and continue to support the risk, but at a lower compensation level.

Thus, in our example, management may elect to participate with transactional capital participants in risks taken, or may bid to reduce the return paid participants, sometimes in exchange for agreements to limit their losses.

Primary capital may also be used to support new products or programs without sufficient history to properly analyze the risk/reward relationship of premium to risk being accepted. This capital support can be subsequently diminished or replaced with transactional capital as actuarial history develops.

The present invention allows unique risks to be unbundled with portions of various risk layers transferred as individually priced components to transactional capital participants or retained by primary shareholders, within the Reserved Assets substructure. This exchange/insurance company composite arrangement is designed to create a market price for the transfer of these components, which adds value such that the sum of the parts is often greater than the whole. In essence, unbundling permits market participants and the insurer-entity to more accurately price components of a risk. The balance remaining after payments to transactional capital participants and expenses of the insurer-entity inures to the benefit of primary shareholders.

Reserve Management Subsystem

The reserve management subsystem uses commonly available data processing hardware augmented by specially designed financial management software. The broad aspects of the subsystem include a method of tracking and monitoring specific investments (financial instruments and fixed assets), allocating them to the insurer-entity's Reserved Assets held by various custodians, a means of determining the insurer-entity's obligations to policyholders, capital participants, professionals, and other parties, and subdividing the Reserved Assets in a manner allowing the insurer-entity to always maintain its ability to fully and completely satisfy these obligations, a method of profiling excess underwriting and investment capacity within the system, as well as other reporting functions, and a reserve management dataprocessor.

I. Reserved Assets

All funds transferred into the insurer-entity's Reserved Assets must be placed with independent custodians and invested pursuant to strict investment guidelines. These restrictions vary within the overall portfolio. For instance, at a given point in time, the portfolio may be required to have 58% of total assets invested in U.S. dollar government securities at a minimum yield of 6.75%, with the balance invested in other assets with a differing yield component. This could change daily as the insurer-entity accepts new underwriting risks, pays claims, interest rates rise or fall, or a variety of other factors affect the liabilities of the insurer entity to policyholders, capital and debt participants, professionals, and other parties.

The reserve management subsystem tracks these assets, allocates them among various custodians, and assures that minimum investment standards are maintained within the portfolio.

The protection of reserved assets in accordance with the present invention by law, by custodial service or otherwise provides for a hierarchy of preferences should the reserved assets, in an unlikely event, be attached by a litigant, creditor or other or should the entity including its reserved assets be liquidated in a legal proceeding. In any of these cases, the order of preference provides for claims made under policies to be paid first followed by fiduciaries, custodians and other professionals and intermediaries (See FIG. 6). Transactional capital participants are paid last with any monies remaining going into general assets.

II. Statutory Reserves

Reserves are generally used for four purposes: a) risk acceptance, b) capital and debt allocation, c) investment activities, and d) administrative functions.

These reserves represent internal accounts on the books of the insurer-entity and are used to easily quantify the amount of liability of the insurer-entity to various external parties and shareholders, as well as providing a means of subdividing the quantum of Reserved Assets.

Risk acceptance reserves allow the insurer-entity to allocate specific policy liabilities to a particular reserve; then match those liabilities through loss reserves, sourced from premium, and capital and/or debt support, each accreting at notional rates sufficient to accrue enough funds to meet each liabilities as it becomes due. As policies are issued, a "charge" or "security interest" is placed on the insurer-entity's Reserved Assets in an amount equal to these present value amounts and their future increases based on notional compounding rates. Thus a portion of the enterprises current assets and future investment earnings is dedicated and matched to each policy obligation incurred. For instance, a policy issued to insure a $10 million residual value of an aircraft in 15 years, would only require the insurer-entity to set aside $3,624,460, at a notional compounding rate of 7%. The insurer-entity would "charge" its Reserved Assets being a $3,624,460 present value charge accreting at 7% for 15 years, for a future value charge of $10 million.

Capital and debt allocation reserves allow the insurer-entity to track its commitments to capital and debt participants as well as accounting for the allocation of these amounts to risk acceptance, investment, and administrative reserves. For example, a capital investor purchases $50 million of a special series preference share dedicated to a specific type of risk. These funds would be used to support the issuance of policies accepting that risk. The shares might provide for a minimum and maximum rate of dividend, based on underwriting and/or investment experience. The reserve documents would set out these parameters and a method of computing dividends to the investor. The actual funds transferred by the investor are placed with custodians and invested by the insurer-entity, generally on a pooled basis. Thus, the actual investment earnings made by the insurer-entity may be different from the investment crediting rate allocated to the capital reserve for further dividend to the investor.

Investment reserves are accounts to which amounts are allocated from capital and debt reserves for the purpose of investing to support underwriting activities, investing specific Reserved Assets in a particular type of investment, or for management by a particular investment manager. In the two latter instances, these assets would generally be segregated to a specific custodian. Actual investment results or notional compounding rates could be used to reallocate a portion of amounts in investment reserves back to capital and debt reserves.

Administrative Reserves accept allocations of a portion of Reserved Assets primarily to assure the insurer-entity's ability to pay future custodial, professional and other fees.

For example, in accepting funds from transactional capital participants or premiums in accepting risk, as well as the income accruing thereon, these funds are transferred to government approved custodians as Reserved Assets and invested pursuant to directions transmitted by the insurer-entity, subject to substantial restrictions. Funds from transactional capital participants are initially allocated to capital and debt reserves, then reallocated to investment reserves. Premiums received for accepting risk are generally transferred to risk acceptance reserves, with a portion to administrative reserves for policy acquisition and future costs. Since that portion of the premium transferred to a risk acceptance reserve is not sufficient to pay the maximum liability of the risk assumed, a transfer reallocation is made from an investment reserve to a risk acceptance reserve to fully support the risk assumed. If losses occur, claims payments made by a custodian reduce amounts allocated to a risk acceptance reserve. In like manner, reductions in liability will also reduce amounts allocated to said reserve, being transfer reallocated an investment reserve and possibly a portion to other reserves or the General Assets of the insurer-entity. Characteristics of these reserves are tailored to meet the needs of a particular transaction or program. The above described use of reserves is descriptive in nature. The system permits maximum flexibility in the allocation and reallocation of assets between reserves.

Amounts allocated to these reserves may be accounted for on a notional cost basis accreting at prescribed rates, or on a mark-to-market basis indexed to specific types of securities. Although specific securities may be identified to a specific reserve, generally amounts allocated to reserves represent an internal allocation of the insurer-entity's Reserved Assets. In essence, all funds held by custodians, represent the quantum of Reserved Assets of the insurer-entity. Amounts allocated to these reserves represent not only respective interests in the current value of assets held by these custodians, but also the future revenues generated by the portfolio.

The reserve management subsystem provides a means of determining the insurer-entity's obligations to policyholders, capital participants, professionals, and other parties, and matches them to assets held by custodians with the insurer-entity's Reserved Assets in a manner allowing the insurer-entity to always maintain its ability to fully and completely satisfy these obligations. The subsystem is designed to maintain this balance between the actual accretion of assets within the insurer-entity's Reserved Assets held by custodians and the notional accretions of the statutory reserves necessary to meet obligations to policyholders, capital and debt participants, professionals, and others.

III. Reporting Functions

Data processing capabilities are supplied for displaying and providing certain routines which monitor and report various optimization opportunities.

For instance, the subsystem reviews the amount of underwriting capacity available within the system categorized by type of program, underwriter, currency, and a variety of other categories which alert participants within the system to both opportunities to accept additional risk, but also the need to acquire additional capital and debt support to continue underwriting at predetermined levels.

The subsystem also monitors changes in interest rates which could increase or decrease underwriting capacity, as well as provide opportunities to trade assets thereby profiting from market movements.

Another function of the subsystem is to assist in asset quality surveillance and report degradation of assets within the insurer-entity's portfolio. The surveillance function will focus on investment portfolio mix to monitor diversification of AAA government issuers, debt obligation types, and to assure that at all times, the insurer-entity's investment portfolio is capable of supporting the payment of a total loss on the aggregate to the insurer-entity's policy obligations, matched to currency and maturity.

Finally, one of its primary reporting functions is to not only report, but assure compliance with the insurer-entity's sophisticated capital matching system. Any changes in assets within the Reserved Assets portfolio must be subject of various certifications and procedures which permit the reserve management subsystem to continuously report that all obligations of the insurer entity, present and in the future, are capable of being fully and completely satisfied from Reserved Assets.

The reserve management subsystem of the present invention need not be limited to the above mentioned fundamental aspects.

While data processing system is preferred for use in carrying out the present method and system, alternative means may be used including telephone networks, facsimile machines, automatic typewriters, and other known office equipment and means for recording and storing information, for displaying such information, and for communicating information rapidly including direct communication between offices.

Matching risk with capital includes the circumstances where persons seeking to transfer risks make known the need to the entity which need is communicated through use of the system before capital is available or similarly capital may be available before the transfer of risks are made known. Capital is secured by solicitation or other means of attracting capital either through the system or by other means. Funds or capital may be raised by the entity by issuing financial instruments, selling shares in the entity, borrowing, or other means.

Entity consultants may include rating agencies, certified accountants, actuaries, consulting actuaries, insurance and financial underwriters or other specialists in finance or insurance which consultants are available to advise the entity and others dealing with the entity.

Finally, capital providers may be any investors including the entity itself.

The foregoing invention has been described in terms of the preferred embodiments. However, those of skill in the art will recognize that many variations of such embodiments exist. Such variations are intended to be within the scope of the present invention and the appended claims.

We claim:

1. A method employing operatively interconnected, input, output and data processing means for facilitating through an entity, the transfer and acceptance of specifically defined risks through the entity from risk transferors to capital providers accepting the risk transferred, the method comprising:

creating an entity for facilitating the transfer of risk from one or more risk transferors through the entity to capital providers accepting the risk through the entity;

creating and maintaining a communications system for communications between risk transferors and capital providers through the entity;

creating within the entity a capital reserve system;

exchanging information between and among one or more risk transferors, one or more capital providers and the entity relating to the nature and character of the risk for the purpose of one or more willing risk transferors entering into a policy/contract with one or more willing capital providers having defined obligations including the maximum monetary exposure on the risk and the duration thereof; and causing the capital provider(s) to transfer sufficient capital to the capital reserve system prior to the effective date of such contract which capital when combined with risk compensation and other income is sufficient to meet any and all such defined obligations during such contract period.

2. The method in accordance with claim 1, further comprising creating risk transfer policy/contracts having policy limits identified to specific accounts, transferring and matching all or a portion of the risk to one or more investors under a capital structure which includes ready means of payment to parties transferring risk, if losses materialize, and segregation of the interests of particular investors to specifically identified risks;

utilizing computer-based storage, processing and retrieval communication and recording means for coordinating the creation of such risk transfer policy/contracts and the capital including segregated interests to provide at all times monies to satisfy the full policy limits of all contracts;

establishing, implementing and administering the system through use of said communication and recording means as a part of a new or existing entity, which includes a capital structure protected by law; and employing said means to effect existing external regulation and fiduciary oversight to assure satisfaction of all contracts, to protect the structure, entity, and parties transferring risk and capital providers from risks of insolvency, judicial intervention by third parties, and other external entity risks.

3. The method of claim 2 further comprising in addition:

creating two fully intergrated capital structures of assets, liabilities, and capital accounts, thereby creating an improved capital structure for such entity; and the further step of allocating, processing and supervising risk between the two capital structures.

4. The method of claim 2 which further comprises:

a step of protecting the system, entity and participants from risks of insolvency, judicial intervention by third parties, and other external entity risks, through enforcement of the laws of the jurisdiction to which the entity is subject and other means; and the step of supervising fiduciary oversight, supervision, and confirmation designed to assure full and complete satisfaction of all agreements entered into by the entity and external participants.

5. The method of claim 2 further comprising:

creating contractual agreements identified to specific reserve accounts;

the step of evaluating whether to agree to the acceptance of risk including the use of entity consultants; and the step of assuring timely payment to parties transferring risk, if losses occur.

6. The method of claim 5 implemented by:

causing to be issued a contractual policy which contains standardized legal clauses, negotiated clauses, claims payment and administrative provisions;

storing available data defining compensation for the risk assumed;

providing access to such intermediaries to coordinate the activities of persons wishing to transfer risk; and providing access to said entity consultants experienced in risk analysis.

7. The method of claim 6 further comprising:

the step of screening a risk prior to submission to the entity consultant;

the step of communicating information regarding a proposed risk to one or more entity consultants;

the step of submitting an electronic application to a particular entity consultant for the transfer of a proposed risk; and the step of receiving a binding commitment from an entity consultant regarding the acceptance of a risk.

8. The method of claim 7 further comprising:

the step of operating a digital computer system to input prescribed information concerning a risk which transmits the information to the entity's underwriting database router for comparison;

the step of operating such computer system to compare the proposed risk to a series of discriminating parameters; and the step of responding to the intermediary with contract counteroffers into which the risk might be accepted, as well as entity consultants to whom the information could be provided for a quotation.

9. The method of claim 1 further comprised of:

creating and storing in interactive pricing model which takes into consideration program guidelines, current and projected market interest rates, an assessment of projected losses, equity and debt return expectations, various cost and profit objective factors, and other information necessary to determine the amount of capital matching support required to accept the proposed risk and the minimum compensation level for accepting the risk; and the step of analyzing an entity consultant's current portfolio of business and capital matching capacity.

10. The method in accordance with claim 1 further comprising:

creating through computer-based data processing means risk transfer contracts which are identified to specific accounts, then transferring and matching all or a portion of the risk to one or more capital providers under a capital structure; which includes ready means of payment to parties transferring risk, if losses materialize, and segregation of the interests of particular capital providers;

utilizing a computer-based data storage, processing and retrieval means for coordination the creation of such risk transfer contracts, and the capital structure including segregated interests to provide at all times monies to satisfy the full limits of all contracts;

operating said computer-based means for establishing, implementing and administering the system as part of a new or existing entity which includes a capital structure protected by law;

employing said computer-based means to effect existing external regulation and fiduciary oversight to assure satisfaction of all contracts, to protect the structure, entity, and parties transferring risk and capital providers from risks of insolvency, judicial intervention by third parties, and other external entity risks.

11. The method of claim 10 further comprising in addition:

creating two fully integrated capital structures of assets, liabilities, and capital accounts; and the further step of electronically allocating, processing and supervising risk diversification revenues and risk between the two capital structures.

12. The method of claim 10 which further comprises:

the step of electronically supervising fiduciary oversight, supervision, and confirmation designed to assure full and complete satisfaction of all agreements entered into by the entity and external participants.

13. The method of claim 10 further comprising:

the step of electronically creating contractual agreements identified to specific reserve accounts, the step of evaluating whether to agree to the acceptance of risk including the use of an entity consultant; and the step of electronically assuring timely payment to parties transferring risk, if losses occur.

14. The method of claim 13 implemented by:

causing electronically to be issued a contract which contains standardized legal clauses, negotiated clauses, claims payment and administrative provisions;

inputting electronically available data defining compensation for the risk assumed;

providing electronic access to such intermediaries to coordinate the activities of persons wishing to transfer risk; and providing electronic access to said entity consultants experienced in risk analysis.

15. The method of claim 14 further comprising:

the step of electronically screening a risk prior to submission to underwriters;

the step of electronically communicating information regarding a proposed risk to one or more underwriters;

the step of submitting an electronic application to a particular underwriter for the transfer of a proposed risk; and the step of receiving a binding commitment from an underwriter regarding the acceptance of a risk.

16. The method of claim 15 further comprising:

the step of operating a digital computer system including inputting prescribed information concerning a risk which system electronically transmits the information to the entity's underwriting database router for comparison;

the step of operating such computer system to compare the proposed risk to a series of discriminating parameters; and the step of responding to the intermediary with contract counteroffers into which the risk might be accepted, as well as entity consultants to whom the information could be provided for a quotation.

17. The method of claim 10 further comprising:

the step of electronically monitoring and supervising primary types of reserve accounts including risk acceptance, capital and debt allocation, investment activities, and administrative functions which are used to quantify the amount of liability of the entity to various external parties and capital providers, as well as providing a means of subdividing the quantum of its reserved assets;

the step of electronically monitoring and supervising specific investments (financial instruments and fixed assets) allocated to the entity's reserved assets held by various custodians;

the step of electronically determining the entity's obligations to contractholders, capital providers, entity consultants, and other parties, subdividing its segregated assets in a manner allowing the entity to always maintain its ability to fill and completely satisfy these obligations, and maintaining this information in an easily retrievable form, with the aid of a digital computer, for review by entity management and others; and the step of graphically profiling excess underwriting and investment capacity within the system, as well as providing other reporting and analytic functions.

18. The method of claim 1 further comprised of:

electronically creating and storing an interactive pricing model which takes into consideration program guidelines, current and projected market interest rates, an assessment of projected losses, equity and debt return expectations, various cost and profit objective factors, and other information necessary to determine the amount of capital matching support required to accept the proposed risk and the minimum compensation level for accepting the risk; and the step of analyzing an entity consultant's current portfolio of business and capital matching capacity.

19. The method in accordance with claim 1 further comprising:

processing the risk through a data processing program which produces a report including all pertinent analytical factors as well as final terms, coverages and limits;

determining the compensation for acceptance of the risk by data processing means;

submitting the risk to an internal underwriting committee of the entity for approval through electronic data retrieval and communication means;

issuing a binding commitment to accept the risk through electronic means operatively connected to the entity's computer-based data receival, processing, retrieval and communication means.

20. The method of claim 19 using in addition:

providing electronic means for determining an underwriting fee, expense component, reserve levels for maximum risk exposure computed and a capital usage cost negotiated with the risk diversification subsystem, modified by the entity consultant's appraisal of market conditions, pricing and capacity; availability of capital capacity, and other more subjective factors.

21. The method of claim 19 having in addition:

the step of employing electronic means for submitting the final report with entity consultant recommendation for acceptance of the risk;

the step of determining sufficient capital is available to support acceptance of the proposed risk;

the step of employing electronic means to input an approval code identified to the proposed transaction and all information submitted upon which such approval is based; and the step of employing electronic means of authorizing the entity consultant to issue a binding commitment, subject of receipt of compensation for accepting the risk.

22. The method in accordance with claim 1, further comprising profiling capacity and other reporting an analytical functions supported by digital computer and a comparative date processing means;

electronic means of determining the amount of risk acceptance capacity available within the system categorized by type of program, entity consultant, currency, and a variety of other categories which alert participants within the system to both opportunities to accept additional risk including means of determining the need to acquire additional capital and debt support to continue accepting risk at predetermined levels;

electronic means of monitoring changes in interest rates which could increase or decrease risk acceptance capacity, as well as provide opportunities to trade assets there profiting from market movements; and electronic means of asset quality surveillance and reporting of degradation of assets within the entity's portfolio, monitoring investment portfolio mix for diversification of AAA government issuers, debt obligation types, and assurance that at all times, the entity's investment portfolio is capable of supporting the payment of obligations, matched to currency and maturity.

23. The method of claim 1 including a step to assure compliance with the entity's risk to capital matching system requiring that any changes in assets within the reserved assets portfolio are subject to various certifications and procedures which permit the reserve management subsystem to continuously report that all obligations of the entity, present and in the future, are capable of being fully and completely satisfied from reserved assets.

24. A system employing operatively interconnected, input, output and data processing means for facilitating through an entity the transfer and acceptance of specifically defined risks through the entity from risk transferors to capital providers for acceptance of the risk transferred, the system comprising:

multiple interactive computer terminal input and output means at diverse locations for use by one or more of the entity, risk transferors transferring risk through the entity, capital providers accepting risk through the entity, their respective intermediaries, underwriters and other assistive, analytical and advisory resources defining a risk acceptance subsystem, a risk diversification subsystem and a reserve management subsystem;

the risk acceptance subsystem including one or more of information input, output and retrieval means operatively connected to the system for information exchange between potential risk transferors and the entity's underwriting database for analysis, generation and output of suggested programs to underwriters to whom the information may be transmitted or accessed for a quotation;

input means to the system for one or more underwriters receiving computer analyzed risk information respecting a potential risk transfer to advise the system as to whether or not any specific underwriter is prepared to recommend the acceptance of the risk and the terms;

output means from the system for advising the potential risk transferor as to willingness of one or more underwriters to recommend acceptance of the risk, terms including limits, premiums and other relevant information;

input means for a potential risk transferor to submit an electronic application to a particular underwriter;

data processing means for receipt, reevaluation and generation of a report respecting the electronic application including relevant information for submission to the entity for underwriting evaluation, acceptance or rejection;

means for transmitting relevant information respecting the potential risk transfer from the systems risk acceptance subsystem to the systems risk diversification subsystem to optimize returns for various classes of investors within the system;

means for electronically issuing a binding commitment to the potential risk transferor upon the system's receiving a signal indicating the entity management's approval of acceptance of the risk;

means for receiving a wire transfer of premium funds from the risk transferor to a custodian and allocation specifically identified reserve account;

means for receiving confirmation of the receipt of premium funds from the custodian;

means for entity management to enter an approval code into a system database for automatic initiation of a policy/contract issuance procedure;

means for creation of one or more reserves within an accounting records database of the system; and means for allocating funds to said reserves to pay a maximum loss under the risk acceptance policy/ contract on a timely basis as well as certain pre-identified administrative and professional fees over the life of the policy/contract.

25. The system of claim 24 having in addition interconnected transmission means for transmitting information by the entity and intermediaries such transmission means useful for facilitating negotiations between such intermediaries by:
   a) making readily available to such intermediaries an offer to contract by an offering intermediary;
   b) making readily available a counteroffer to the offering intermediary.

26. The system of claim 24 having in addition
   an automated data processing routing system including a digital computer and modem, which upon selecting one or more entity consultants or programs to whom the information is to be submitted, routes the previously input information to the appropriate parties in the form of a request for quotation.

27. The system of claim 24 further comprising:
   a means of receiving a request for quotation at a selected price and the pertinent information regarding a particular risk;
   means of producing a report analyzing the proposed risk, aided by a data processing program which compares the proposed risk to a set of guidelines broadly designed to assure compliance with specific program objectives, capital matching limitations, and system constraints; and
   a means of responding to the intermediary as to whether or not the entity consultant is prepared to recommend the acceptance of the risk and at such price.

28. The system in accordance with claim 24 further comprising:
   a) input means for creating a plurality of capital accounts including primary capital accounts and a plurality of transactional capital accounts for the entity;
   b) storage means for storing information related to first intermediaries representing persons seeking to transfer risks;
   c) storage means for storing information related to second intermediaries representing persons seeking to provide capital to accept such risks;
   d) interconnected terminal means for inputting information by the entity and first and second intermediaries and for retrieving such information; such terminal means useful for facilitating negotiations among such intermediaries by
      i) inputting an offer to contract by an offering intermediary;
      ii) retrieving such offer by another intermediary;
      iii) inputting a counteroffer by the offering intermediary;
   e) electronic means for providing contract language for use by such intermediaries;
   f) means for the entity to enter a code to approve a policy/contract created by entity consultants;
   g) means for storing approved policy/contract data;
   h) means for receiving claims and comparing the claims to such policy/contract data.

29. The system of claim 28 employing:
   an automated data processing routing system including a digital computer and modem, which upon electronically selecting one or more entity consultants or programs to whom the information is to be submitted, routes the previously input information to the appropriate parties in the form of a request for quotation.

30. The system of claim 24 further comprising:
   a means of electronically receiving a request for quotation at a selected price and the pertinent information regarding a particular risk;
   means of electronically producing a report analyzing the proposed risk, aided by a data processing program which compares the proposed risk to a set of guidelines broadly designed to assure compliance with specific program objectives, capital matching limitations, and system constraints; and
   a means of electronically responding to the intermediary as to whether or not the entity consultant is prepared to recommend the acceptance of the risk and at such price.

31. The system in accordance with claim 24;
   a data storage and display system;
   means for inputting and storing to establish reserve accounts prior to the issuance of a policy/contract accepting risk;
   means for inputting and storing to allocate sufficient assets to fully and completely satisfy the risk accepted to said reserve accounts;
   means for calculating the method of investment of such asserts required to assure the entity's ability to pay under the policy/contract; and
   means for inputting a request for loss payments and determining appropriate payments to be made to the policy/contract holder.

32. The system in accordance with claim 24 including an automated policy/contract acceptance and issuance data processing employing a digital computer, which involves:
   a means for inputting and confirming receipt of the compensation for acceptance of a risk;
   means for creating segregated reserves and allocating assets to such reserves prior to issuance of a risk accepting policy/contract;
   means for entering a signal to authorize issuance of a policy/contract.

33. The system of claim 32 comprised in addition:
   communication means for instructing the transfer of compensation for acceptance of the risk to a particular custodian for the benefit of the entity accepting the risk;
   means for inputting and storing information to establish an identified reserve account to which the compensation is allocated;
   means for inputting and storing an electronic confirmation by a custodian of receipt of the compensation.

34. The system of claim 32 having in addition:
   a means of inputting the underwriting committee's risk acceptance authorization code for the particular risk in the automated issuance system; and
   a means of inputting the amount of funds received and a wire transfer code from the custodian confirming receipt of compensation for acceptance of the risk;
   means for inputting for ready retrieval created segregated reserves within the accounts of the entity accepting the risk, separate accounts for contract holders, capital participants, entity consultants, and for other purposes, which further permit the entity, fiduciaries regulatory parties to ascertain the entity's obligations and its ability to fully and completely satisfy such obligations on a timely basis; and
   a means for inputting for ready retrieval to allocate the compensation received among the various reserve accounts to assure the entity's ability to fully and completely satisfy the terms of the contract and to provide for administrative and professional fees associated with acceptance of the risk.

35. The contract issuance system of claim 32, where upon receipt of compensation, creation of reserve accounts, and allocation of assets sufficient to fully and completely satisfy the obligation of the contract further means include:

electronic means including a digital computer system including a printer are used to prepare the risk acceptance contract accepting risk in a specified amount against a specified risk occurring during a given time period; and electronic means of filing a security interest on the assets of the accepting entity with appropriate government offices.

36. The system of claim 32 further comprising:

the step of electronically monitoring and supervising four primary types of reserve accounts (risk acceptance, capital and debt allocation, investment activities, and administrative functions) which are used to quantify the amount of liability of the entity to various external parties and shareholders, as well as providing a means of subdividing the quantum of its reserved assets;

the step of electronically monitoring and supervising specific investments (financial instruments and fixed assets) allocated to the entity's reserved assets;

the step of electronically determining the entity's obligations to contractholders, capital participants, entity consultants, and other parties, subdividing its segregated assets in a manner allowing the entity to maintain its ability to full and completely satisfy these obligations, and maintaining this information in an easily retrievable form, with the aid of a digital computer, for review by entity management and other; and the step of graphically profiling excess underwriting and investment capacity within the system and other reporting and analytical functions.

37. The system of claim 24 comprising:

means of establishing reserve accounts prior to the issuance of a contract accepting risk;

means of allocating sufficient assets to fully and completely satisfy the risk accepted to such reserve accounts;

means for calculating the type and nature of investment of such assets required to assure the entity's ability to pay under the contract; and means for presenting a request for loss payments and determining appropriate payments to be made to the contract party.

38. The system of claim 37 having in addition:

a means of receiving a request for claims payment for losses covered under the contract, along with the specific documentation required by the contract;

a process of determining that such losses are consistent with the terms and conditions of the contract; and a method of paying the claim under the contract and reducing the liability of the entity to the contract holder, noting such reduction in its reserve accounts.

39. The system of claim 24 further comprising:

a means of acquiring capital through the issuance of various financial instruments with maximum flexibility and diversification, to support risks the entity accepts, and may include the assistance of entity consultants;

a means of issuing such financial instruments, receiving funds therefore, while segregating and protecting the interests of each specific party providing such funds; and a method of allocating funds from specific parties to a specific risk or diversification across a group of risks.

40. The system of claim 39 further comprising a means of attracting capital support through redeemable preference shares or other forms of equity of the entity, which are dedicated to and provide return based on the performance of a specific risk, risk accepted through one or more entity consultants, performance of one or more investment managers, or any combination of factors which determine dividends to be paid on the preference shares, as well as the length of time such capital will be available to support risks, as well as limitations on the risks to which funds may be applied.

41. The system of claim 39 further comprising a means of providing floating rate, convertible, or other debt or annuity obligations which provide the entity the ability to vary the interest it pays and repayment terms of the obligation, based in part on the performance of a specific risk, risk accepted through one or more entity consultants, performance of one or more investment managers, or any combination of factors which affect the entity's ability to pay interest, as well as the length of time such debt proceeds will be available to support risks, as well as limitations on the risks to which such funds may be applied.

42. The system of claim 39 further comprising a means of providing supporting risks through allocation of risk acceptance compensation, loss reserves, investment income, directly to the account of specific capital providers, based on the performance of a specific risk, a type of risk a group of risks, performance of risks accepted through by one or more entity consultants, performance of one or more investment managers, or any combination of factors which determine allocations to be made to the capital provider, as well as the length of time such funds will be available to support risks, as well as limitations on the risks to which such funds may be applied.

43. The system of claim 39 further comprising a means of selling future interests in cash flows of the entity, future reduction in liability emanating from a particular reserve account or other derivative securities, based on the performance of a specific risk, a type of risk, a group of risks, performance of risks accepted through one or more entity consultants, performance of one or more investment managers, or any combination of factors.

44. The system of claim 39 further comprising:

a means of packaging financial instruments whose use may be restricted and limited to and return based on specific criteria, providing a capital provider maximum flexibility in design and diversification; and a means of providing capital providers custom portfolio diversification marketed through investment bankers and other intermediaries.

45. The system of claim 39 further comprising:

a means of creating a financial instrument whose dividend, price or interest earnings are partially or wholly determined by the performance of all or a portion of a specific risk the instrument was designed to support, or a group of risks categorized by type, a particular entity consultant or investment manager or other distinguishing criteria.

46. The system of claim 39 further comprising:

a means for market professionals analyzing gaps in an capital provider's portfolio and the types of securities which would maximize a capital provider's overall portfolio's performance, as well as the types and quality of risks which the capital provides is prepared to accept, then custom designing one or more contracts to fill these gaps; and a means of providing flexibility of portfolio diversification for capital providers, from virtually no diversification in supporting a single risk, to the maximum diversification of a capital provider providing funds through one or more financial instruments, designed to support many risks, or different types, limiting the amount of any one risk to a small amount of the overall portfolio.

47. The system of claim 39 further comprising a means of creating reserve accounts within the entity accepting the funds, which constitutes a separate accounts or ledgers permitting an allocation of the interests of the party transferring funds;

a means of creating a document which establishes limitations on the use of funds from specific investors to support specific risk acceptance and investment objectives, which sets out the uses and purposes of the reserve account, recording the quantum of funds allocated to each account, the maximum period such funds may remain allocated thereto, any compounding rate at which additional funds might be credited to the account, types of investment risk to which such funds may be subjected, the type of risks and/or parties for whose risks such funds could be supportive, the terms under which funds could be reallocated to other reserve accounts for allocations representing professional and administrative fees, and other purposes, custodians to hold the funds, and other documented restrictions, limitations and conditions to which the entity must adhere;

a means of inputting reserve usage parameters in the data processing system;

a means of preparing the financial instrument including the specific terms of its form, payments to be made to the capital provider in the future, and other pertinent conditions;

a means of instructing the transfer of funds to the entity custodian and acknowledging receipt of said funds in exchange for the financial instrument; and a means of confirming receipt of the funds transferred to the entity custodian(s).

48. The system of claim 39 further comprising:

a means of allocating and supervising funds received from a capital reserve to one or more investment managers or entity consultants identified in reserve documentation, which are granted authority to invest, manage, and/or allocate funds within parameters established for the reserve to specific risk acceptance and/or investment activities; and a means of electronically comparing each allocation to a risk acceptance or investment activity for compliance with reserve criteria previously input in the data process system.

49. The system of claim 24 further comprising:

electronic means of determining the amount of risk acceptance capacity available within the system categorized by type of program, entity consultants, currency, and a variety of other categories which alert participants within the system to opportunities to accept additional risk, and for determining the need to acquire additional capital and debt support to continue risk acceptance at predetermined levels;

electronic means of monitoring changes in interest rates which could increase or decrease risk acceptance capacity, as well as provide opportunities to trade assets thereby profiting from market movements; and electronic means of asset quality surveillance and reporting of degradation of assets within the entity's portfolio, monitoring investment portfolio mix for diversification of AAA government issuers, debt obligation types, and assurance that at all times, the entity is capable of supporting the payment of a total loss on the aggregate of the entity's contract obligations, matched to currency and maturity.

50. The system of claim 24 including a means of subdividing the entity's assets, liabilities, and capital accounts into two groups, referred herein as general assets and reserved assets; and means for providing protection for such reserved assets, including protection from the claims of general creditor, against bankruptcy or liquidation, limiting the use of reserved assets to specific agreements pertaining to each reserve.

51. The system of claim 24 further comprising:

a means of creating classes of capital providers of the entity.

52. The system of claim 24 further comprising:

a means of permitting external parties to deal with the entity through its reserved assets and its general assets;

a means of permitting entity consultant participation in the operations of the entity; and a means of the entity's internal staff providing support services to entity consultants, intermediaries, parties transferring risks, and capital providers.

53. The system of claim 52 further comprising:

a means for intermediaries to bring prospective risk transfer participants to the entity for risk acceptance;

a means for investment bankers to bring prospective capital providers to the entity for risk diversification;

a means for entity consultants to maximize the compensation received for the acceptance of a particular risk, while taking all prudent actions to minimize the possibility of future losses, obtaining funds required in excess of risk compensation and investment income to support a risk from primary capital allocated by management and/or transactional capital allocated in some cases by a number of investment managers, or in some cases direct from transactional capital providers; and a means for investment managers to maximize profitability on reserved assets sourced from transactional capital providers, by increasing the return paid on or percentage of profits received for the use of capital funds, through negotiating with entity consultants to place transactional capital in support of various risks, by way of providing capacity for an annual risk acceptance program or bidding on capital to support a specific risk.

54. The system of claim 52 further comprising:

a means of internal staff administering and supervising the involvement of various system participants, maintaining the internal data processing systems, programs, and communication links, and generally encouraging a marketplace usage approach to the acquisition of new business;

a means of developing new uses of the system;

a means of facilitating capital matching between entity consultants and investment managers through direct electronic access to information between the parties; and an electronic comparative means which aids entity consultants in completing their capital support profiles for the acceptance of a specific risk or for annual program capacity to write a particular type of risk, negotiate a portion of future profits or agree on agreed rates of return for funds to support these risks, by electronically publishing these opportunities to selected investment managers or directly to capital participants, along with a comparative analysis highlighting certain of these opportunities which could fill gaps in a portfolio or diversification profile.

55. The system of claim 24 further comprising:

a means, aided by digital computer, of computing and retaining fee information charged with respect to each transaction of the entity in providing risk taking and capital matching activities to various market participants, similar in some respects to fees charged by exchanges;

a means of unbundling components of unique or difficult to place risks allocated to different accounts, with various risk layers transferred as individually priced components to capital participants or retained by primary equity, with revenues remaining after payments to capital participants and expenses of the entity, inuring to the benefit of primary equity;

a means of electronic risk to capital matching surveillance which monitors the pricing of risks being transferred to capital participants, comprising compensation levels with information stored in digital computer memory, alerting the entity's management of transactions in which transactional capital compensation may be identified as potentially excessive when compared to current market conditions; and a means which permits the entity to reduce compensation to capital participants, if compensation levels seem to be excessive, through placing a competing bid using primary equity capital to support a particular risk if compensation sought by capital providers to support a risk is deemed excessive, allowing capital providers to match the bid and continue to support the risk, but at a lower compensation level, or participate with primary equity in supporting the risk.

56. The system of claim 24 where the entity is modified in structure of and laws to which an entity is subject by altering the legislation of the jurisdiction under which the entity is governed, which includes:

a means of issuing contracts which accept risk, and other legally enforceable contracts, which are recognized by jurisdiction as inviolate and not subject to recession on the grounds of preference or other conditions of bankruptcy or any party to such contracts.

57. The system of claim 24 where the entity is modified in structure of and laws to which an entity is subject by altering the legislation of the jurisdiction under which the entity is governed, which includes:

a means of recording the specific contractual provisions of said contracts, subject to inspection of government.

58. The system of claim 24 where the entity is modified in structure of and laws to which an entity is subject by altering the legislation of the jurisdiction under which the entity is governed, which includes:

a means of establishing in the records of the entity statutorily recognized individual reserves which clearly delineate the entity's obligations to parties who have transferred risk, capital providers, and other participants.

59. The system of claim 24 where the entity is modified in structure of and laws to which an entity is subject by altering the legislation of the jurisdiction under which the entity is governed, which includes:

a means of transferring assets collectively or individually allocated to such reserves to the custody of government approved fiduciary parties for safekeeping.

60. The system of claim 24 where the entity is modified in structure of and laws to which an entity is subject by altering the legislation of the jurisdiction under which the entity is governed, which includes:

a means of segregating assets allocated to such reserves from other assets of the entity, permitting transfer between reserved and general assets, and further protecting the reserved assets from general creditors of the entity and prohibiting any change to or use of the segregated assets for any purpose, other than for which the assets were segregated, by a liquidator or any other party in the event of a liquidation or the bankruptcy of the entity.

61. The system of claim 24 where the entity is modified in structure of and laws to which an entity is subject by altering the legislation of the jurisdiction under which the entity is governed, which includes:

a means of placing a "charge", "mortgage", or other form of security interest on reserved assets supporting an accepted risk to the extent of its total maximum liability and filing an instrument with government recognizing such security interest.

62. The system of claim 24 where the entity is modified in structure of and laws to which an entity is subject by altering the legislation of the jurisdiction under which the entity is governed, which includes:

a means of reducing such security interest as the entity's liability with respect to a contract is diminished, subject to the conditions placed on the entity by rating agencies or consulting actuaries, and further subject to third party confirmation by independent public accountants or actuaries that after such reduction in segregated assets the entity is at all times capable of paying its total maximum liability on all contracts issued on a timely basis.

63. The system of claim 24 where the entity is modified in structure of and laws to which an entity is subject by altering the legislation of the jurisdiction under which the entity is governed, which includes:

a means of recognizing claims and other amounts to be paid out under contract, providing a corresponding payout from reserved assets.

64. The system of claim 24 where the entity is modified in structure of and laws to which an entity is subject by altering the legislation of the jurisdiction under which the entity is governed, which includes:

a means of prohibiting entity from issuing a contract for which it does not have sufficient assets allocated to its segregated reserves to pay the total maximum liability of the contract on a timely basis.

65. The system of claim 24 where the entity is modified in structure of and laws to which an entity is subject by altering the legislation of the jurisdiction under which the entity is governed, which includes:

a means of reallocating assets from one reserve to another or to general assets, subject to agreements entered into pursuant to each reserve, said agreements being recognized by government as being inviolate in the event of bankruptcy, liquidation or claims of general creditors and other parties.

66. The system of claim 24 where the entity is modified in structure of and laws to which an entity is subject by altering the legislation of the jurisdiction under which the entity is governed, which includes:

a means of identifying and protecting the interests of specific capital providers, one from another, with the capability to distribute profits to specific capital providers without the governmental restrictions on dividends and capital reduction generally imposed on insurance companies and financial institutions.

67. The system of claim 24 where the entity is modified in structure of and laws to which an entity is subject by altering the legislation of the jurisdiction under which the entity is governed, which includes:

a means of extinguishing liability of the entity to a contract party by transferring assets in kind in the event of a collapse of the currency in which the contract is denominated, a moratorium on interest payments by the respective government, or existence of any other government related default.

68. The system of claim 24 where the entity is modified in structure of and laws to which an entity is subject by altering the legislation of the jurisdiction under which the entity is governed, which includes:

a means of limiting governmental ability to windup the entity and specifically to preclude any party to petition the liquidation, bankruptcy, or winding-up of the insurer-entity, and further prohibiting a liquidator from changing the terms of any contract or agreement or segregated assets allocated to reserves.

69. The system of claim 24 further comprising:

a means of identifying fiduciary custodians as well as provisions for changing such custodians, identifying and transferring reserved assets to custodians, and ascertaining that such assets shall be held apart from the assets of each custodian and other parties, in a safe and secure manner.

70. The system of claim 24 further comprising:

a means of segregating the notional value of reserved assets held by a custodian into parts, one representing notional value which is charged or has a security interest placed thereon to support specific contractual obligations, and the second part being the balance of the assets which are not subject to a perfected security interest.

71. The system of claim 24 further comprising:

a means of restricting the investment quality and type of securities to which reserved assets subject to a security interest may be invested.

72. The system of claim 24 further comprising:

a means of providing claims and other payments from reserved assets subject to security interest, which assures compliance with underlying contractual terms and assures the highest degree of safety and security in the transfer of such payments.

73. The system of claim 24 further comprising:

a means of changing securities representing reserved assets subject to security interest subject to confirmation by rating agency(ies) and accountants or actuaries that the entity after such change has complied with required provisions and is fully capable of meeting the maximum of its obligations on a timely basis.

74. The system of claim 24 a further comprising:

a means of recognizing a reduction in contractual liability and reducing reserved assets subject to security interest, subject to confirmation by rating agency(ies) and accountants or actuaries that the entity after such reduction has complied with required provisions and is fully capable of meeting the maximum of its obligations on a timely basis.

* * * * *

UNITED STATES PATENT AND TRADEMARK OFFICE
CERTIFICATE OF CORRECTION

PATENT NO. : 5,704,045
DATED : December 30, 1997
INVENTOR(S) : Douglas L. King, et al.

It is certified that error appears in the above-identified patent and that said Letters Patent is hereby corrected as shown below:

| | | |
|---|---|---|
| Title Page, | | Attorney, Agent, or Firm, before "William Squire" add --John N. Bain--. |
| Column 7, | Line 19, | Change "reference" to --preference--. |
| Column 8, | Line 63, | After "insurer" insert -- --entity--. |
| Column 19, | Line 21, | Change "of" to --on--. |
| Column 21, | Line 2, | Change "liabilities" to --liability--. |
| Column 27, | Line 42, | Change "date" to --data--. |
| Column 30, | Line 16, | After "claim 24;" insert --and--. |
| | Line 25, | Change "asserts" to --assets--. |
| | Line 60, | After "fiduciaries" insert --and--. |

Signed and Sealed this

Twentieth Day of October, 1998

Attest:

BRUCE LEHMAN

*Attesting Officer*     *Commissioner of Patents and Trademarks*